(12) United States Patent
Singh et al.

(10) Patent No.: US 10,154,099 B2
(45) Date of Patent: *Dec. 11, 2018

(54) METHOD, SYSTEM, AND COMPUTER PROGRAM PRODUCT FOR DELIVERING SMART SERVICES

(71) Applicant: Scenera Mobile Technologies, LLC, Raleigh, NC (US)

(72) Inventors: Munindar P. Singh, Cary, NC (US); Mona Singh, Cary, NC (US)

(73) Assignee: Scenera Mobile Technologies, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,839

(22) Filed: Nov. 8, 2013

(65) Prior Publication Data

US 2014/0067907 A1 Mar. 6, 2014

Related U.S. Application Data

(63) Continuation of application No. 13/651,615, filed on Oct. 15, 2012, now Pat. No. 8,611,870, which is a (Continued)

(51) Int. Cl.
*H04L 29/08* (2006.01)
*G06Q 10/10* (2012.01)
*H04W 8/18* (2009.01)

(52) U.S. Cl.
CPC .............. *H04L 67/16* (2013.01); *G06Q 10/10* (2013.01); *H04W 8/18* (2013.01)

(58) Field of Classification Search
CPC .......... G08B 21/24; H04W 4/02; H04W 8/18; G06Q 10/109; G06Q 10/10; G06Q 30/02; H04L 67/18; H04L 67/16; H04L 41/16; H04L 41/5048; H04L 41/5054; G01S 5/0252; H04M 2203/6009; H04M 3/42374

See application file for complete search history.

(56) References Cited

U.S. PATENT DOCUMENTS 4,611,094 A 9/1986 Asmuth et al.
4,893,336 A 1/1990 Wuthnow
(Continued)

FOREIGN PATENT DOCUMENTS

JP 07-283868 10/1995

OTHER PUBLICATIONS

Federal Register/vol. 79, No. 241/Tuesday, Dec. 16, 2014 Rules and Regulations, p. 74624.*
(Continued)

*Primary Examiner* — Matthew C Sams

(57) ABSTRACT

A method, system, and computer program product are described for delivering smart services. According to an exemplary embodiment, a method for delivering smart services includes defining a situation including subscriber context information based on private information of a service subscriber. The method includes identifying an action associated with the first situation. The method includes determining that the service subscriber is in the defined situation based on current subscriber context information. The method includes performing, in response to determining that the service subscriber is in the defined situation, the action.

18 Claims, 8 Drawing Sheets

Related U.S. Application Data continuation of application No. 13/323,092, filed on Dec. 12, 2011, now Pat. No. 8,311,525, which is a continuation of application No. 11/618,856, filed on Dec. 31, 2006, now Pat. No. 8,099,084.

(56) References Cited

U.S. PATENT DOCUMENTS

| | | |
|---|---|---|
| 5,185,782 A | 2/1993 | Srinivasan |
| 5,289,531 A | 2/1994 | Levine |
| 5,592,541 A | 1/1997 | Fleischer, III et al. |
| 5,608,789 A | 3/1997 | Fisher et al. |
| 5,748,098 A | 5/1998 | Grace |
| 5,787,162 A | 7/1998 | Javitt |
| 5,802,159 A | 9/1998 | Smolentzov et al. |
| 5,872,841 A | 2/1999 | King et al. |
| 5,938,721 A | 8/1999 | Dussell et al. |
| 5,953,393 A | 9/1999 | Culbreth et al. |
| 5,970,122 A | 10/1999 | Laporta |
| 6,047,053 A | 4/2000 | Miner et al. |
| 6,081,725 A | 6/2000 | Ishida |
| 6,118,861 A | 9/2000 | Guzman |
| 6,119,101 A | 9/2000 | Peckover |
| 6,154,644 A | 11/2000 | Murray |
| 6,177,905 B1 | 1/2001 | Welch |
| 6,199,099 B1 | 3/2001 | Gershman et al. |
| 6,202,062 B1 | 3/2001 | Cameron et al. |
| 6,266,612 B1 | 7/2001 | Dussell et al. |
| 6,411,899 B2 | 6/2002 | Dussell et al. |
| 6,477,374 B1 | 11/2002 | Shaffer et al. |
| 6,484,033 B2 | 11/2002 | Murray |
| 6,515,585 B2 | 2/2003 | Yamamoto |
| 6,611,754 B2 | 8/2003 | Klein |
| 6,671,818 B1 | 12/2003 | Mikurak |
| 6,680,675 B1 | 1/2004 | Suzuki |
| 6,704,303 B1 | 3/2004 | Bowman-Amuah |
| 6,707,812 B1 | 3/2004 | Bowman-Amuah |
| 6,731,625 B1 | 5/2004 | Eastep et al. |
| 6,745,025 B1 | 6/2004 | Chow et al. |
| 6,751,307 B2 | 6/2004 | McAlinden |
| 6,754,181 B1 | 6/2004 | Elliot et al. |
| 6,771,761 B1 | 8/2004 | Lapierre |
| 6,771,953 B1 | 8/2004 | Chow et al. |
| 6,804,509 B1 | 10/2004 | Okon et al. |
| 6,807,263 B2 | 10/2004 | Kible et al. |
| 6,819,256 B2 | 11/2004 | Hampton |
| 6,850,252 B1 | 2/2005 | Hoffberg |
| 6,868,525 B1 | 3/2005 | Szabo |
| 6,879,838 B2 | 4/2005 | Rankin et al. |
| 6,904,408 B1 | 6/2005 | McCarthy et al. |
| 6,909,708 B1 | 6/2005 | Krishnaswamy et al. |
| 6,943,671 B2 | 9/2005 | McGee et al. |
| 6,944,539 B2 | 9/2005 | Yamada et al. |
| 6,957,076 B2 | 10/2005 | Hunzinger |
| 7,003,525 B1 | 2/2006 | Horvitz et al. |
| 7,006,881 B1 | 2/2006 | Hoffberg et al. |
| 7,023,979 B1 | 4/2006 | Wu et al. |
| 7,068,775 B1 | 6/2006 | Lee |
| 7,084,758 B1 | 8/2006 | Cole |
| 7,124,101 B1 | 10/2006 | Mikurak |
| 7,130,807 B1 | 10/2006 | Mikurak |
| 7,145,898 B1 | 12/2006 | Elliot |
| 7,155,456 B2 | 12/2006 | Abbott, III et al. |
| 7,181,438 B1 | 2/2007 | Szabo |
| 7,224,775 B1 | 5/2007 | Shaffer et al. |
| 7,242,988 B1 | 7/2007 | Hoffberg et al. |
| 7,248,841 B2 | 7/2007 | Agee et al. |
| 7,298,327 B2 | 11/2007 | Dupray et al. |
| 7,299,257 B2 | 11/2007 | Boyer et al. |
| 7,330,895 B1 | 2/2008 | Horvitz |
| 7,395,507 B2 | 7/2008 | Robarts et al. |
| 7,409,423 B2 | 8/2008 | Horvitz et al. |
| 7,444,383 B2 | 10/2008 | Horitz |
| 7,480,260 B1 | 1/2009 | Vashisht et al. |
| 7,512,889 B2 | 3/2009 | Newell et al. |
| 7,522,608 B2 | 4/2009 | Samdadiya et al. |
| 7,525,484 B2 | 4/2009 | Dupray et al. |
| 7,530,020 B2 | 5/2009 | Szabo |
| 7,533,082 B2 | 5/2009 | Abbott et al. |
| 7,564,840 B2 | 7/2009 | Elliot et al. |
| 7,609,637 B2 | 10/2009 | Doshi et al. |
| 7,614,001 B2 | 11/2009 | Abbott et al. |
| 7,647,283 B2 | 1/2010 | Singh et al. |
| 7,764,167 B2 | 7/2010 | Reeves et al. |
| 7,765,173 B2 | 7/2010 | Singh et al. |
| 7,958,457 B1 | 6/2011 | Brandenberg et al. |
| 7,991,711 B2 | 8/2011 | Singh et al. |
| 8,041,658 B2 | 10/2011 | Singh et al. |
| 8,099,084 B2 | 1/2012 | Singh et al. |
| 8,311,525 B2 | 11/2012 | Singh et al. |
| 2001/0053213 A1 | 12/2001 | Truong et al. |
| 2002/0067308 A1 | 6/2002 | Robertson |
| 2002/0076010 A1 | 6/2002 | Sahai |
| 2002/0083025 A1* | 6/2002 | Robarts et al. .......... 706/12 |
| 2002/0086680 A1 | 7/2002 | Hunzinger |
| 2002/0097856 A1 | 7/2002 | Wullert |
| 2002/0116461 A1 | 8/2002 | Diacakis et al. |
| 2002/0120351 A1 | 8/2002 | Tuomela et al. |
| 2002/0131565 A1 | 9/2002 | Scheuring et al. |
| 2002/0146104 A1 | 10/2002 | McIntyre |
| 2002/0163572 A1 | 11/2002 | Center et al. |
| 2002/0164995 A1 | 11/2002 | Brown et al. |
| 2003/0007617 A1 | 1/2003 | McAlinden |
| 2003/0014491 A1 | 1/2003 | Horvitz et al. |
| 2003/0059016 A1 | 3/2003 | Lieberman et al. |
| 2003/0069874 A1 | 4/2003 | Hertzog et al. |
| 2003/0108173 A1 | 6/2003 | Gray |
| 2003/0131069 A1 | 7/2003 | Lucovsky et al. |
| 2003/0154293 A1 | 8/2003 | Zmolek |
| 2003/0215075 A1 | 11/2003 | Schwab et al. |
| 2003/0217098 A1 | 11/2003 | Bobde et al. |
| 2003/0224762 A1 | 12/2003 | Lau et al. |
| 2003/0225589 A1 | 12/2003 | Eaton et al. |
| 2003/0235287 A1 | 12/2003 | Margolis |
| 2004/0107025 A1 | 6/2004 | Ransom et al. |
| 2004/0174971 A1 | 9/2004 | Guan |
| 2004/0176107 A1 | 9/2004 | Chadha |
| 2004/0192311 A1 | 9/2004 | Koskinen et al. |
| 2004/0203847 A1 | 10/2004 | Knauerhase et al. |
| 2004/0230685 A1 | 11/2004 | Seligmann |
| 2005/0009507 A1 | 1/2005 | Gilbert |
| 2005/0009573 A1 | 1/2005 | Tokkonen |
| 2005/0041793 A1 | 2/2005 | Fulton et al. |
| 2005/0102098 A1 | 5/2005 | Montealegre et al. |
| 2005/0254510 A1 | 11/2005 | Oja et al. |
| 2005/0265318 A1 | 12/2005 | Khartabil et al. |
| 2006/0031301 A1 | 2/2006 | Herz et al. |
| 2006/0077055 A1 | 4/2006 | Basir |
| 2006/0093116 A1 | 5/2006 | Baird |
| 2006/0182251 A1 | 8/2006 | Seligmann et al. |
| 2006/0225076 A1 | 10/2006 | Longobardi |
| 2006/0233324 A1 | 10/2006 | Vardi et al. |
| 2006/0268698 A1 | 11/2006 | Shaffer et al. |
| 2007/0022377 A1 | 1/2007 | Haider et al. |
| 2007/0036279 A1 | 2/2007 | Tam et al. |
| 2007/0072629 A1 | 3/2007 | Bae |
| 2007/0121878 A1 | 5/2007 | Shaffer et al. |
| 2007/0159322 A1 | 7/2007 | Garratt Campbell |
| 2007/0201646 A1 | 8/2007 | Metcalf |
| 2007/0226034 A1 | 9/2007 | Khan |
| 2007/0230282 A1 | 10/2007 | May et al. |
| 2007/0250257 A1 | 10/2007 | Almy |
| 2007/0255786 A1 | 11/2007 | Mock et al. |
| 2008/0021998 A1 | 1/2008 | Wentink |
| 2008/0079566 A1 | 4/2008 | Singh et al. |
| 2008/0080699 A1 | 4/2008 | Skubnik et al. |
| 2008/0082651 A1 | 4/2008 | Singh et al. |
| 2008/0160968 A1 | 7/2008 | Singh et al. |
| 2008/0162160 A1 | 7/2008 | Singh et al. |
| 2008/0162387 A1 | 7/2008 | Singh et al. |
| 2010/0070444 A1 | 3/2010 | Singh et al. |
| 2010/0077082 A1 | 3/2010 | Hession et al. |
| 2010/0306179 A1 | 12/2010 | Lim |

(56) References Cited

U.S. PATENT DOCUMENTS

2011/0010320 A1 1/2011 Singh et al.
2011/0252080 A1 10/2011 Singh et al.
2012/0084339 A1 4/2012 Singh et al.

OTHER PUBLICATIONS

Roy, N., et al., "A Cooperative Learning Framework for Mobility-Aware Resource Management in Multi-Inhabitant Smart Homes," Mobile and Ubiquitous Systems: Networking and Services 2005, MobiQuitous 2005, the 2nd. Annual International Conference, Jul. 17-21, 2005, pp. 393-403.
Gelenbe, E., et al., "Autonomous Smart Routing for Network QoS," Proceedings of the 2004 International Conference on Autonomic Computing, May 17-18, 2004, pp. 232-239, Digital Object Identifier 10.1109/ICAC.2004.1301368.
Roy, N., et al., "Enhancing Availability of Grid Computational Services to Ubiquitous Computing Applications," Proceedings of the 19th IEEE International Parallel and Distributed Processing Symposium, Apr. 4-8, 2005, pp. 92a-92a, Digital Object Identifier 10.1109/IPDPS.2005.201.
Rosenberg, et al., "IP Telephony Charter," [online] Internet Engineering Task Force, Nov. 28, 2001 [retrieved on Jan. 28, 2010] Retrieved from the Internet: <URL: http://http://www.ietf.org/proceedings/52/224.html>, 7 pages.
"Microsoft Office Communicator 2005 Overview," [online] Microsoft Corporation, 2005 [retrieved on Sep. 8, 2005]; Retrieved from the Internet: <URL: http://www.microsoft.com/office/livecomm/communicator/prodinfo/overview.mspx> 3 pages.
Wahl, M., et al., "RFC 2251—Lightweight Directory Access Protocol (v3)," [online] Internet Engineering Task Force, Dec. 1997 [retrieved on Jan. 28, 2010] Retrieved from the Internet: <URL: http://www.ietf.org/rfc/rfc2251.txt>, 44 pages.
Howes, T., et al., "RFC 2425—A MIME Content-Type for Directory Information," [online] Internet Engineering Task Force, Sep. 1998 [retrieved on Jan. 28, 2010] Retrieved from the Internet: <URL: http://www.rfc-editor.org/rfc/rfc2425.txt>, 29 pages.
Dawson, F., et al., "RFC 2445—Internet Calendaring and Scheduling Core Object Specification," [online] Internet Engineering Task Force, Nov. 1998 [retrieved on Jan. 28, 2010] Retrieved from the Internet: <URL: http://www.ietf.org/rfc/rfc2445.txt>, 128 pages.
Bhawalkar, P., et al., "ScheduleNanny: Using GPS to Learn the User's Significant Locations, Travel Times and Schedule," [online] Sep. 2004 [retrieved on Apr. 21, 2006] Retrieved from the Internet: <URL: http://arxiv.org/ftp/cs/papers/0409/0409003.pdf> 8 pages.
Chan, C.K., et al., "Spares-Inventory Sizing for End-to-End Service Availability," Proceedings of the 2001 Reliability and Maintainability Symposium, Jan. 22-25, 2001, pp. 98-102, Digital Object Identifier 10.1109/RAMS.2001.902449.
Rosenberg, et al., "Telephony Routing Over IP (TRIP)," [online] Internet Engineering Task Force, Nov. 1, 2000 [retrieved on Jan. 28, 2010] Retrieved from the Internet: <URL: http://tools.ietf.org/html/draft-ietf-iptel-trip-04.txt>, 89 pages.
Ashbrook, D., et al., "Using GPS to Learn Significant Locations and Predict Movement Across Multiple Users," [online] Georgia Institute of Technology, 2003, [retrieved on Sep. 8, 2005]; Retrieved from the Internet: <URL:http//www.cc.gatech.edu/ccg/publications/persubi2003.pdf>, 15 pages.
"WAP Architecture Specification," WAP Forum Ltd., Apr. 30, 1998, 20 pages.

* cited by examiner

METHOD, SYSTEM, AND COMPUTER PROGRAM PRODUCT FOR DELIVERING SMART SERVICES

RELATED APPLICATIONS

This application is a continuation of U.S. patent application Ser. No. 13/651,615, titled "METHOD, SYSTEM, AND COMPUTER PROGRAM PRODUCT FOR CREATING SMART SERVICES," filed on Oct. 15, 2012 which is a continuation of U.S. patent application Ser. No. 13/323,092, titled "METHOD, SYSTEM, AND COMPUTER PROGRAM PRODUCT FOR CREATING SMART SERVICES," filed on Dec. 12, 2011 which is a continuation of U.S. patent application Ser. No. 11/618,856, titled "METHOD, SYSTEM, AND COMPUTER PROGRAM PRODUCT FOR CREATING SMART SERVICES," filed on Dec. 31, 2006 which is related to U.S. patent application Ser. No. 11/618,857, titled "METHOD, SYSTEM, AND COMPUTER PROGRAM PRODUCT FOR DELIVERING SMART SERVICES," and Ser. No. 11/618,862, titled "METHOD, SYSTEM, AND COMPUTER PROGRAM PRODUCT FOR ADAPTIVELY LEARNING USER PREFERENCES FOR SMART SERVICES," each having a shared specification with, filed on even date with, and commonly owned with U.S. patent application Ser. No. 11/618,856. This application is also related to U.S. patent application Ser. No. 11/536,232, titled "SYSTEM AND METHOD FOR PROVIDING A TASK REMINDER", filed Sep. 28, 2006, also commonly owned with this application, the entire disclosure of which is here incorporated by reference.

COPYRIGHT NOTICE

Portions of the disclosure of this patent application contain material that is subject to copyright protection. The copyright owner has no objection to the facsimile reproduction by anyone of the Patent and Trademark Office patent file or records, but otherwise reserves all copyright rights whatsoever.

BACKGROUND

Smart services combine basic service functions, such as communication, personal information management (PIM), and location services with personal (often private) subscriber information to yield services that are tailored to each subscriber's particular needs. The private subscriber information can include subscriber preferences of the subscriber, changing subscriber situations (such as a location or activity associated with the subscriber), and other private subscriber data.

To maximize their return on investment, service providers, such as telecommunications service providers, and enterprises can benefit from enabling third-party service developers (i.e., developers that are not part of the given telecommunications service provider's organization or enterprise administrative domain) to be able to develop services for users. Such developers can contribute new and creative solutions to address users' needs (e.g., for an enterprise) and potentially generate additional revenues for the service provider or enterprise. Because such third-party service developers are external to the service provider's organization or the enterprise's administrative domain, it may be imprudent for service providers to fully trust these external developers in developing and deploying services for their customers.

Under conventional approaches, service developers must interface directly with the services and associated private subscriber data maintained by service providers to deliver smart services to the providers' subscribers. This can lead to the undesirable result of having to expose core service functionality and private subscriber data to the developers during development of a smart service or when the service is deployed and used. Similarly, subscribers typically must interface directly with each of the service providers offering a particular smart service to the subscriber. Various service providers may not provide for a consistent interface to their services, leading to an inconsistent subscriber experience across all of the services offered. In addition, service providers may not want to expose core functionality of their smart services to the service hosting providers that will host these services. Accordingly, what is needed is a method, system, and computer program product for creating smart services.

SUMMARY

According to an exemplary embodiment, a method for creating smart services includes defining a service based on a situation of a service subscriber and an event for interacting with the subscriber on behalf of the service. Access is provided to subscriber context information based on private subscriber information. The subscriber context information is used in determining a current situation of the subscriber. The method allows the service to use the subscriber context information to generate a response to the event on behalf of the subscriber without the service having direct access to the private subscriber information.

According to another exemplary embodiment, a system is described for creating smart services including a service model component configured to define a service based on a situation of a service subscriber and an event for interacting with the subscriber on behalf of the service. The system further includes a user agent component operatively coupled to the service model component. The user agent component is configured to provide access to subscriber context information based on private subscriber information and to use the subscriber context information to determine a current situation of the subscriber. The system also includes a service agent component operatively coupled to the user agent component. The service agent component is configured to allow the service to use the subscriber context information to generate a response to the event on behalf of the subscriber without the service having direct access to the private subscriber information.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

Overview of the Smart Services Middleware Platform

Figure 2:
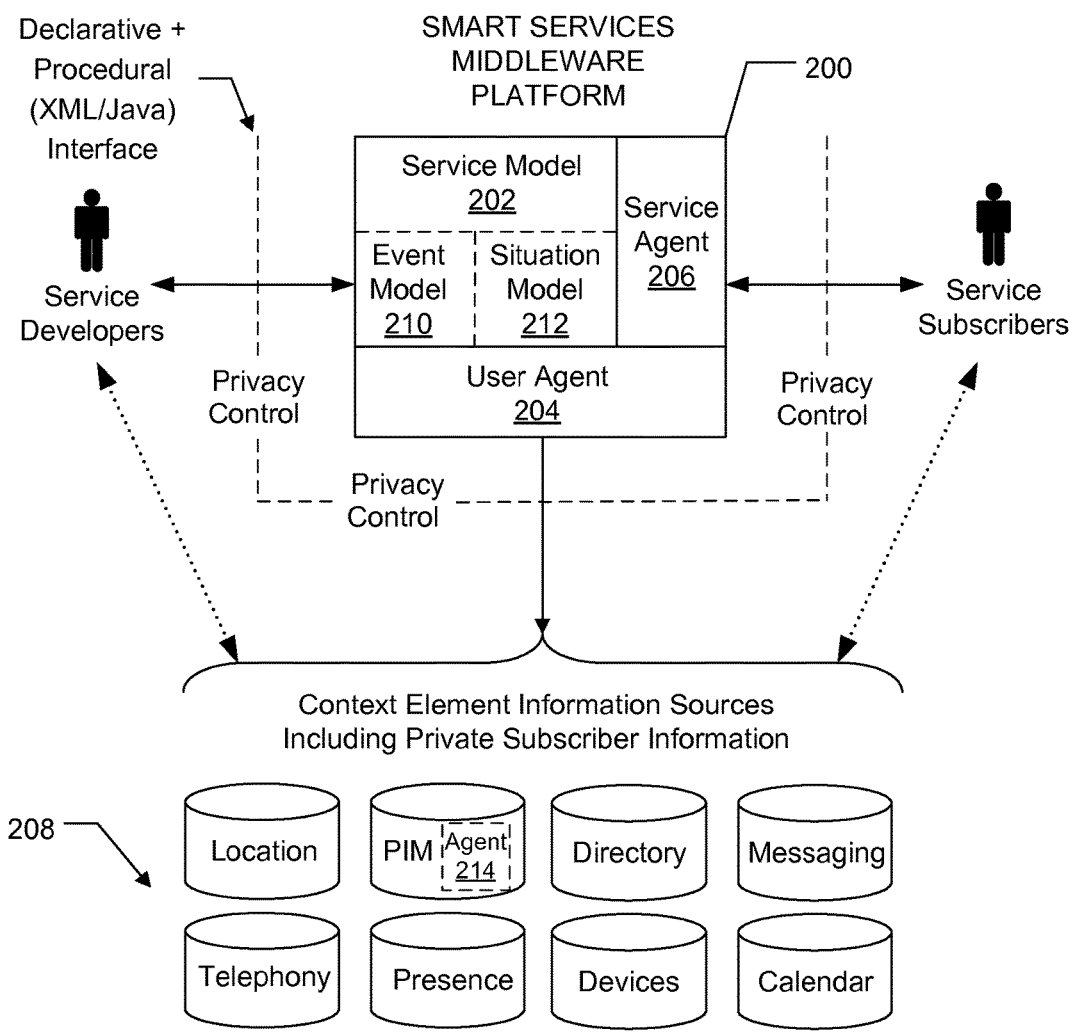
FIG. 2 illustrates an exemplary system for creating smart services, according to an exemplary embodiment.

FIG. 2 illustrates a high-level diagram of a system for creating smart services, according to an exemplary embodiment. The exemplary system includes a smart services middleware platform 200 that facilitates the creation of smart services. The smart services middleware platform 200 can be hosted by a service provider, such as a wireless telecommunications service provider, and allows service developers to create smart services for the service provider even though the service developers are not part of, or affiliated with, the service provider's organization or administrative domain. Service developers can use the middleware platform 200 to create smart services without requiring direct access to either the core service functionality or the private service subscriber data associated with the underlying service. Similarly, the middleware platform 200 can be used to provide a consistent subscriber interface for the smart services offered by different service providers The phrase "without requiring [or having] direct access," as used here, means that a particular entity does not have access to information, code, data, and the like, in its original, unaltered form. Instead, the information (e.g., private subscriber information), code, or data is abstracted in some way, e.g., via the use of context element components 304 and other service model components 202, as described in greater detail below, and it is in this abstracted form, if at all, that the information, code, or data is provided to the entity. The phrase does not mean simply that the information, code, or data is not accessed or obtained by the entity in its original, unaltered form via an intermediary.

Users (or subscribers) interact with the platform 200 using an electronic device, such as a handheld personal computer (PC), personal digital assistant (PDA), network-enabled camera, camera phone, cell phone, and the like. As the user moves about, his or her situation can change. The user's situation can change as a result of his or her mobility, the passage of time, the user's changing set of activities, the relevance of different entries on his or her calendar, and other such resources. Changes in the user's situation can be treated as being implicitly observed and reflected in the environment in which the user operates the device. Some or all of the different aspects of the changes to a user's situation are reflected in updates to context element information sources 208 (such as the user's calendar, among others).

The middleware platform 200 is configured to ascertain the user's situation as modeled using the context element information sources 208. When the user, via his or her device, interacts with a smart service provided via the platform 200, the platform 200 can ensure that the particular service's behavior is sensitive to (or reflective of) the user's current situation. The extent of the sensitivity of a service to the user's situation depends on how the service is configured, including the context element information sources 208 the service is allowed to base its functionality upon. The configuration depends, as described below in the section titled "Creation of Smart Services," on what context element information sources 208 are installed, provided, or available for use by the service provider, which of these context sources 208 the user has subscribed to (or paid for), which context sources 208 the service developer has requested to deliver a particular service, which context sources 208 include information that the user has permitted or authorized to be revealed to the service developer's code, and which of the context sources 208 the user has permitted or authorized the service provider to use as a basis for a particular service interaction.

In a particular embodiment, the user's device interacts with the middleware platform 200 via making World Wide Web, or hypertext transfer protocol POST (HTTP POST), calls to an application server on which the middleware platform 200 is installed and running. For example, all the components of the middleware platform 200 shown in FIG. 2 can be hosted within a general-purpose JAVA™ 2 Platform, Enterprise Edition (J2EE™) application server, such as the JBOSS™ product provided by Red Hat, Inc.

The platform 200 should be made compatible with the various protocols and/or proprietary interfaces supported by each of the context element information sources 208 to which the platform 200 can interact. The application program interfaces (APIs) and privacy control elements of the platform 200 allow owners of the context element information sources 208 to exchange information with the platform 200 while maintaining the confidentiality of their respective data sources 208. This allows disparate, even competitive, gatherers/aggregators of subscriber context to provide context information to the platform 200 without revealing information to other suppliers of subscriber context information. To this end, context element information source suppliers can use local agents, such as the PIM agent 214, to interact with the platform 200.

The terms "user" and "subscriber" are sometimes used here interchangeably. It will be understood that a subscriber is a class of user of a particular smart service that has an active subscription (e.g., via the service provider) to the smart service. Consequently, the distinction between users and subscribers of a smart service in the context here is not of primary importance.

Creation of Smart Services

Figure 1:
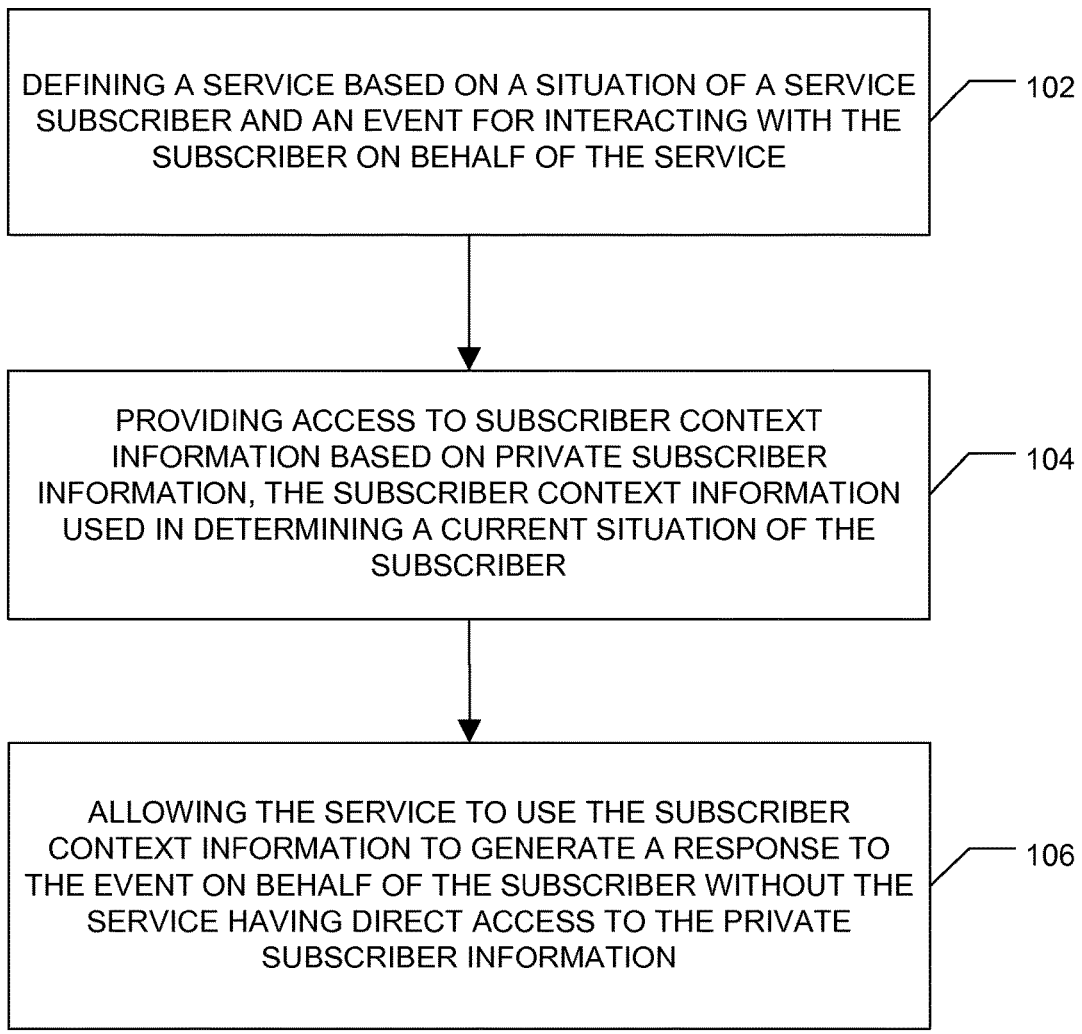
FIG. 1 is a flowchart illustrating a method for creating smart services, according to an exemplary embodiment.

An exemplary method 100 for creating smart services is illustrated by the flowchart shown in FIG. 1. A system for performing the method 100 shown in FIG. 1 for creating smart services is depicted in FIG. 2, portions of which will be referred to below in describing the method 100.

In a first block 102 of the flowchart shown in FIG. 1, a service is defined based on a situation of a service subscriber and an event for interacting with the subscriber on behalf of the service. The system shown in FIG. 2 includes means for defining a service based on a situation of a service subscriber and an event for interacting with the subscriber on behalf of the service. For example, the exemplary system shown in FIG. 2 includes a service model component 202 configured to define a service based on a situation of a service subscriber and an event for interacting with the subscriber on behalf of the service. The service model component 202 is used to define a smart service by associating a service event with a particular subscriber situation.

As shown in the FIG. 2, the exemplary service model component 202 includes a situation model component 212 and an event model component 210. The situation model component 212 can be used to describe subscriber context information used in determining a subscriber's current situation. For example, a subscriber's current situation may be defined as a combination of the current time, the current day of the week, and the subscriber's current location. The event model component 210 describes the attributes of an event that is generated by a smart service on behalf of the service 300. For example, for an event that is an incoming message to a subscriber, exemplary event attribute components 308 could include a relationship of the subscriber with a sender of the message (e.g., a colleague, a friend, or family member) and whether the message is a reply to a previous message sent by the subscriber. Both the situation model component 212 and event model component 210 will be described in greater detail below.

Figure 3:
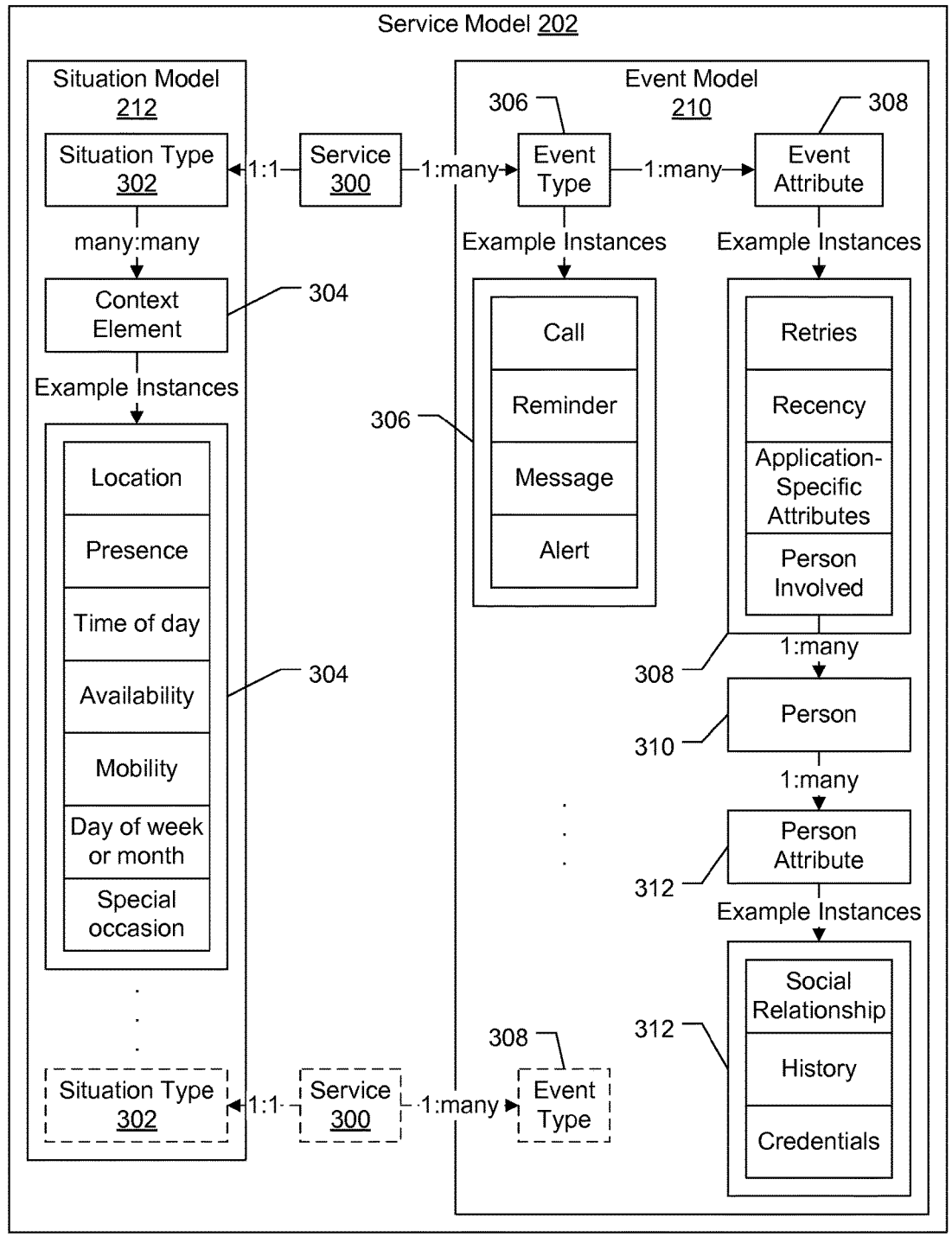
FIG. 3 provides a detailed view of a service model component depicted in the exemplary system for creating smart services shown in FIG. 2, according to an exemplary embodiment.

FIG. 3 provides a detailed view of the service model component 202 depicted in the exemplary system for creating smart services shown in FIG. 2. The service model component 202 shown in FIG. 3 depicts conceptually how smart services can be defined using the techniques described here and provides exemplary configurations for the situation model component 212 and event model component 210 discussed briefly above.

Single-boxed components shown in the figure represent primary components of the service model component 202, such as the situation type component 302, the context element component 304, the event type component 306, the event attribute component 308, the person component, and the person attribute component shown. Double-boxed components shown in the figure represent examples of the primary components of the service model component 202. For example, "call," "reminder," "message," and "alert" represent examples of event type components 306 components that can be of relevance with different smart services.

Arrows in the diagram represent relationships between components at which the arrows, respectively, originate and terminate. The annotations on each arrow indicate the participation and cardinality requirements of a given relationship. For example, a service is defined as an association between one situation type component 302 and one or more event type components 306 ("many"). The situation type component 302 is related to one or more context element components 304. Likewise, an event type component 306 is related to one or more event attribute components 308.

The event type components 306 and their event attribute components 308 are relevant to the service developer. The situation type component 302 defines an abstract situation type component 302 that can be selected from among a number of situation type components 302 supported by the service provider. The service developer choose the desired situation type component 302 to support their smart service only if the service provider makes the corresponding situation type component 302 available. The choice of the situation type component 302 can be governed by its documentation, which could potentially specify some or all of the context element components 304 involved in the determination of that situation type component 302.

To maintain subscriber privacy, generally, the service developer would not be able to verify whether the specified context element components 304 are in fact used in determining the chosen situation type component 302. Thus, the mapping of the situation type component 302 to the appropriate context element components 304 is generally known only directly by the service provider. The context element components 304 are based on private subscriber information as determined by one or more computational systems either maintained by or accessible via the service provider.

The choice of the context element components 304 involved in determining a given situation type component 302 is generally governed by a number of data gathering subscriptions acquired (or purchased) by the subscriber from the service provider and by permissions granted by the subscriber. In other words, the subscriber may choose to subscribe to a higher or a lower level of situation type component 302 depending on which context element components 304 he or she wishes the service provider to maintain and/or gather for him or her, and depending on which context element components 304 he or she wishes to be involved in the determination of his or her current situation.

For example, a service provider may offer to a subscriber, for an additional fee, the ability to have the service provider maintain and/or gather information for determining a location content element component used in delivering smart services to the subscriber. The subscriber can decide not to allow (or pay for) the location context element component 304 to be factored into some or all services to which he or she subscribes. The decisions by the subscriber can be refined to a per-service level. That is, a subscriber may decide to pay for the location context element component 304 to maintained and/or gathered by the service provider, allowing situation type components 302 to be determined that involve location. However, the subscriber may instead prefer to apply a location-based situation type component 302 for some services (e.g., a smart shopping service), but not for other services (e.g., a smart multimedia instant messaging service).

As discussed above, FIG. 3 illustrates an exemplary structure of the service model component 202 shown in FIG. 2. As shown in the figure, the exemplary service model component 202 includes both the situation model component 212 and the event model component 210 described briefly above. A service 300 is defined as an association between one situation type component 302 and one or more event type components 306, as warranted by the smart service 300 being created. A service 300 can be associated with a single situation type component 302 because the corresponding subscriber situation has independent conceptual existence. The same situation type component 302 may be used in multiple services 300 if desired or warranted. Additionally, the service model component 202 can be configured to define a single service 300 or can be used to define multiple services 300 by associating a different situation type component 302 with appropriate event type components 306 (components shown in hashed lines at the bottom of the figure).

The situation model component 212 included in the service model component 202 is a collection of situation type components 302, each corresponding to a particular situation of a service subscriber. Each situation type component 302 can be based on one or more context element components 304. The context element components 304 represent an abstraction of private subscriber information, public information, and perhaps attributes of a service 300 itself used in determining the corresponding situation type component 302 for a subscriber.

Private subscriber information is maintained and/or gathered by the platform 200 via the context element information sources 208 described above. These sources 208 provide "definitive" information regarding the various aspects of a subscriber's situation. These sources 208 are definitive in the sense that they are the sources that are trusted and used by the platform 200 to determine subscriber context and situational information. Nevertheless, the information provided by the sources 208 could be incorrect or out of date, in which cases, the presumed situation of a subscriber would not match the subscriber's true situation and the accuracy of the reasoning provided by the platform 200 and hosted services could be diminished. The context element information sources 208 could be hosted and/or provided by the service provider, or can be provided by third-party supplier and hosted anywhere, provided the sources 208 can communicate with the platform 200.

The following provides examples of various context element components 304 and exemplary context element information sources 208 used in determining the subscriber context:

Position to location mappings (e.g., a form of geographic information system or GIS): MYSQL™ relational database management system (DBMS) accessed using a JAVA™ Database Connectivity (JDBC) API;

Position information: Ericsson's MOBILE POSITIONING SERVER™ (MPS) via an HTTP interface; and Calendar: IPLANET™ calendar server via an HTTP interface. Subscribers can access this calendar server from a browser to modify their calendar entries.

There are no constraints as to the types of context element components 304 the platform 200 can support, although certain types of context element components 304 are sensible for use with most modern mobile smart service applications and can be readily computationally realized in modern networks. These sensible context element component 304 types include:

Position, as determined by position determining/gathering equipment, such as a global position system (GPS), that produces a subscriber's current geographic coordinates;

Mobility based on changes in position, which can estimate how rapidly the subscriber is, or recently has been, moving;

Location, which traditionally involves the mapping of subscriber's position to a GIS, and can describe (to appropriate granularity) whether the subscriber is at home, at work, traveling, in the mall, at the cinema, and the like;

Time of day and day of week or month, which can be readily produced from a calendaring system without regard to a particular subscriber;

Work hours, recreation hours, and other special occasions, which can be readily produced using a calendaring system based on a subscriber's settings;

Busy, such as when a subscriber is participating in meeting (with various characteristics), which can be using a calendaring system based, perhaps, on a subscriber's settings, or perhaps from an enterprise calendaring system if a subscriber-specific calendar is not available; and Other specialized or custom context element components 304, such as, perhaps, an AroundWork component that could result from a combination of the position component described above, a map or geographical information system component, and a WorksAt component that uses a personal or enterprise directory that provides the work locations of a given subscriber.

According to an exemplary embodiment, the subscriber context information based on private subscriber information can include at least one of a location, a presence, an identity, an availability, a mobility, an activity, a status, a communicability, a physical state, a mental state, an interactability, and a sociability associated with the subscriber. For example, the exemplary service model component 202 shown in FIG. 3 includes a situation model component 212 including one or more context element components 304 representing subscriber context information based on private subscriber information. The one or more context element components 304 can represent at least one of a location, a presence, an identity, an availability, a mobility, an activity, a status, a communicability, a physical state, a mental state, an interactability, and a sociability associated with the subscriber. The situation model component 212 can also include one or more additional context element components 304 representing subscriber context information based on public context information. These one or more additional context element components 304 can represent at least one of a time, a day, a month, a year, ambient conditions, geographic information, climatic information, contact directory information, traffic information, and news information.

The exemplary service model component 202 shown in FIG. 3 also includes the event model component 210 described above. A service developer develops the event model component 210 to support the particular smart service 300 being created. The event model component 210 can be declaratively specified, along with the entire service model component 202, to the platform 200, e.g., using a resource description format (RDF) representation that is renderable in an extensible markup language (XML) format, and then computed the platform 200 during service 300 creation. The event model component 210 is a collection of event type components 306, each corresponding to a particular service event. Each event type component 306 can be associated with zero or more event attribute components 308 in the model. The name of the event type component 306, typically descriptive of the service event it represents, can be treated as an attribute, so there is, in effect, always one attribute.

There are no constraints as to types of event attribute components 308 that may be defined by the event model component 210, although certain types of event attribute components 308 are sensible for use with most modern mobile smart service applications and can be readily computationally realized in modern networks. Services 300 should employ unique event type components 306, where possible, and should utilize corresponding event attribute components 308 that the service developer has determined to be meaningful and potentially valuable to a subscriber. For example, consider an event type component 306 corresponding to an incoming phone call service event. Possible event attribute components 308 for the incoming call event can include:

A caller, e.g., a person or entity;

Whether the call is an apparent retry, where the immediately preceding one or more calls by a same caller have gone unattended;

How recently an immediately preceding call from a same caller arrived; and

Whether the call is marked with some annotation of urgency (assuming that it overlies some extensible standard such as session initiation protocol or SIP, which allows for such annotations).

Smart service applications can be interactive, meaning that a subscriber can interact with one or more other subscribers or entities associated with the platform 200. For this reason, a person model component can be a useful generic functionality to add to the event model component 210 definition. Modeling person attributes is helpful to the delivery of smart services, as such attributes can often effect how certain events involving particular persons (or entities) are treated by a subscriber. Also, person attributes are familiar to subscribers, allowing subscribers to better capture their requirements and understand the system's behavior when it is formulated in terms of such attributes. Some examples of person attributes that are sensible in a typical interactive smart service application include:

Social relationship: is this person a family member, friend, colleague, member of the subscriber's affinity group, and the like;

History of interactions with the subscriber; and

The person's credentials, e.g., someone who is not known to the subscriber, but may contact the subscriber, perhaps as an employee of a same company, resulting in a greater likelihood that the person will have a meaningful interaction with the subscriber. Consequently, the subscriber may be more likely to accept such a person's call or respond to the person's message, rather than from a mere stranger.

According to an exemplary embodiment, the method 100 of FIG. 1 includes allowing for the event to be defined in terms of an event type component 306 and an associated event attribute component 308. For example, the service model component 202 shown in FIG. 2 includes an event model component 210 configured to define the event in terms of one or more event type components 306 and one or more associated event attribute components 308. The one or more event type components 306 can represent at least one of a call, a reminder, a message, and an alert. The one or more associated event attribute components 308 can represent at least one of a number of event retries, a recency of a related past event, and an attribute 312 of a person 310 component related to the event. Person attributes 312 can include at least one of a relationship between the subscriber and the person, a history between the subscriber and the person, and credentials of the person, as described above.

According to a related exemplary embodiment, the event model component 210 can be configured to define a composite event in terms of a combination of a first event type component 306, and its associated one or more event attribute components 308, and a second event type component 306, and its one or more associated event attribute components 308. The composite event can be used for interacting with the subscriber on behalf of a service 300. The composite event can represent a pattern across a plurality of events related to the service 300 for interacting with at least one of the subscriber and another user on behalf of a service 300.

Although typically events are generated by the service 300, it is conceivable that certain events are not generated by the service 300, but instead are generated by the middleware platform 200 and, in effect, are observed and responded to by the service 300 hosted by the platform 200. Examples of such external events include an incoming phone call or message. With such arrangements, the middleware platform 200 must be configured to determine to which service 300 a particular platform 200-generated event belongs and to determine the corresponding subscriber to dispatch such events. In addition, to best ensure unambiguous interactions with the various service subscribers, it is preferable, although not necessary, that the event type components 306 for a particular service 300 defined to be unique to the service 300. Assuming that an event makes sense to a subscriber, it would be both poor design and administration to have multiple services 300 that could respond to the event, thereby forcing an arbitrary response and potentially confusing the subscriber.

Exemplary Service Model Component Definition

As described above, the service model component 202 defines the situation type components 302, events, and services 300 that are supported by platform 200 and can be formalized in a graph-theoretic representation, such as an RDF representation that is renderable in an XML format. In the particular exemplary embodiment provided below, the service model component 202 associates its constituent components with certain JAVA™ classes that implement them. The classes correspond to several of the example situation model component 212 and event model component 210 attributes described above. These classes can be used to extract the appropriate information from the context element information sources 208 external to the platform 200 related to those attributes.

In particular, the exemplary embodiment defines a smart call service, "SimpleCallService," that binds a situation type component 302, "SimpleSituation," with a event type component 306, "Call." The situation type component 302, "SimpleSituation," is implemented in the example using the JAVA™ class RealSituation, and utilizes context element components 304 corresponding to a meeting size, a time, a day, and a location (abstractly). The "Call" event type component 306 utilizes event attribute components 308 corresponding to person (called or calling) and a recency of a last call. Comments are demarcated in the example by "<!-- and -->" delimiters and are italicized for readability.

```
<!-- Service binds "SimpleSituation" situation and "Call" event. -->
<rdfs:Class rdf:ID="SimpleCallService">
    <rdfs:subClassOf rdf:resource="#Service"/>
    <situationType rdf:resource="#SimpleSituation"/>
    <eventType rdf:resource="#Call"/>
</rdfs:Class>
<!-- "SimpleSituation" implemented by Java class RealSituation and -->
<!-- combines attributes of meeting size, time, day, and location. -->
<rdfs:Class rdf:ID="SimpleSituation">
    <rdfs:subClassOf rdf:resource="#Situation"/>
    <classDefinition rdf:resource="com.server.learn.RealSituation"/>
    <hasAttribute rdf:resource="#MeetingAttr"/>
    <hasAttribute rdf:resource="#LocationAttr"/>
    <hasAttribute rdf:resource="#TimeAttribute"/>
    <hasAttribute rdf:resource="#DayAttr"/>
</rdfs:Class>
<!-- Three definitions follow for attributes of situations that -->
<!-- refer to FiniteRangeAttribute type, which is discussed below. -->
```

-continued

```
<rdfs:Class rdf:ID="MeetingAttr">
    <rdfs:subClassOf rdf:resource="#FiniteRangeAttribute"/>
</rdfs:Class>
<rdfs:Class rdf:ID="LocationAttr">
    <rdfs:subClassOf rdf:resource="#FiniteRangeAttribute"/>
</rdfs:Class>
<rdfs:Class rdf:ID="DayAttr">
    <rdfs:subClassOf rdf:resource="#FiniteRangeAttribute"/>
</rdfs:Class>
<!-- "Call" event uses person & recency of last call attributes. -->
<rdfs:Class rdf:ID="Call">
    <rdfs:subClassOf rdf:resource="#Event"/>
    <hasAttribute rdf:resource="#PersonCategoryAttr"/>
    <hasAttribute rdf:resource="#RecencyAttr"/>
</rdfs:Class>
<rdfs:Class rdf:ID="PersonCategoryAttr">
    <rdfs:subClassOf rdf:resource="#FiniteRangeAttribute"/>
</rdfs:Class>
<rdfs:Class rdf:ID="RecencyAttr">
    <rdfs:subClassOf rdf:resource="#FiniteRangeAttribute"/>
</rdfs:Class>
```

In a second block 104 of the exemplary method 100 shown in FIG. 1, access is provided to subscriber context information based on private subscriber information. The subscriber context information is used in determining a current situation of the subscriber. The system shown in FIG. 2 includes means for providing access to subscriber context information based on private subscriber information. For example, the system includes a user agent component 204, operatively coupled to the service model component 202, that is configured to provide access to subscriber context information based on private subscriber information.

The user agent component 204 is included in the platform 200 to perform functions on behalf of the user during service delivery. Primary functions of the user agent component 204 are to maintain the subscriber's user model component 502 (described in greater detail below), to track the subscribers changing situation, and to respond to requests from service agent components 206 (also described below) related services 300 delivered to the subscriber. In conjunction with these functions, the user agent component 204 is configured to perform the following tasks:

Constructing/determining a subscriber's current situation, as configured by the service model component 202, by referencing the applicable context element information sources 208;

Accessing a subscriber's user model component 502, based the subscriber's current situation and/or on a particular event and its attributes, to either determine how to filter information determined from the subscriber's context element components 304 for delivery to a requesting service agent component 206 or to determine a predicted availability or responsiveness of the subscriber for the requested event; and Updating a subscriber's user model component 502 to reflect feedback obtained from the subscriber via a service agent component 206. The updating of the subscriber's user model component 502 can depend upon the attributes of the given event and details of the context element components 304 used to determine the subscriber's current situation.

The user agent component 204 can include a situation constructor component (not shown) configured to obtain "real-time" information from the context element information sources 208 to construct the user's current situation. The situation constructor can be requested to determine the subscriber's current situation whenever the service 300 (via its service agent component 206) has the need to access some element of the subscriber's situation or to determine the subscriber's predicted response to a particular event. The situation constructor thus provides observational input to the service agent component 206 via the user agent component 204 to allow a suitable response to a given event to be determined by the service 300.

According to an exemplary embodiment of the method 100, a user model is provided for the subscriber based on attributes of the situation and event defining the service 300. The user model defines at least one of the subscriber context information available to determine the current subscriber situation and a probability related to an availability of the subscriber for responding to the event in terms of attributes of the situation and the event that define the service 300. For example, the system shown in FIG. 2 includes a user model component 502, operatively coupled to the user agent component 204, that is based on attributes of the situation and event defining the service 300 via the service model component 202. The user model component 502 is configured to define the subscriber context information available to determine the current subscriber situation and/or a probability related to an availability of the subscriber for responding to a particular event using attributes of the situation and the event that define the service 300

The user model component 502 is used to define the subscriber information the platform 200 may use, represent, or provide during service delivery. This information can include, for example, whether certain context element components 304 (part of the situation model component 212 above) for the subscriber can be revealed to a smart service application for the application to decide a suitable course of action in responding to a service event. Alternatively or additionally, the user model component 502 can capture the probability that a user is available for responding to or interested in a particular service application or will respond to a particular service event based on the event attribute components 308 (as derived from the event model component 210) and the subscriber's current situation (as derived from the context element components 304 defined by the situation model component 212).

For example, the user model component 502 may include a probability value indicating that a subscriber should not be interrupted with a message from a colleague when the subscriber is in the company of family and when the message is received after the subscriber's normal business hours. In this example, the event is the message, the colleague is an attribute of the message (e.g., a caller attribute), and being in the company of family after normal business hours are attributes of the subscriber's situation. The user model component 502 can include an entry corresponding to these event and situation attributes having a low probability (say, 30%) assigned, to indicate that the subscriber is unlikely to respond to the message, and thus should not be interrupted.

Service providers can maintain a user model component 502 for each their subscribers. The user model component 502 can support decisions made by a subscriber's user agent during delivery of a service 300. The user model component 502 governs a response to an event proposed by a service agent component 206. The response to an event could include subscriber context element component 304 information and/or may be a prediction of whether the subscriber is available, responsive to, or interested in a particular service event.

The user model component 502 can be embodied in several forms, each useful for a different intended purpose. For example, the user model component 502 can be configured to:

Specify which of the subscriber's context element components 304 can be revealed to a particular service agent component 206. For example, the user model component 502 can be configured to inform a smart enterprise messaging application of the subscriber's location;

Specify which of the subscriber's context element components 304 can be revealed to a particular service agent component 206 for a particular event type component 306, together with its corresponding event attribute components 308. For example, the user model component 502 can be configured to inform the smart enterprise messaging application of the subscriber's location if the message is an urgent message from the subscriber's supervisor;

Specify how the subscriber's context element components 304 can be filtered so that the subscriber information the components represent can be revealed to a particular service agent component 206 for a particular event type component 306, together with its corresponding event attribute components 308. For example, the user model component 502 can be configured to inform the smart enterprise messaging application of the subscriber's location precisely if the subscriber is at work, but to replace all other subscriber locations with the generic descriptor of "not at work;" and Specify that the predicted availability of the subscriber can be revealed to a particular service agent component 206, generally without revealing any of the subscriber's context element components 304. With this arrangement, the event may be forwarded to the subscriber by the service 300 if the predicted availability is sufficiently high. For example, the user model component 502 can be configured to inform the smart enterprise messaging application whether or not the subscriber is likely to join an instant messaging (IM) session with a customer, but to not inform the messaging application of the subscriber's location or other private information at the time of the IM session.

Exemplary User Model Definition

The exemplary user model component 502 shown below is configured to predict an availability, responsiveness, interest (or the like) of a subscriber for a particular service event. Thus, the user model component 502 shown below is configured to provide a set of probability distributions. The exemplary user model component 502 represents an initial user model for a particular subscriber. This user model component 502 is configured to support adaptive learning techniques (described in greater detail below) that allow for modification of the probability distributions used in predicting a subscriber's availability for responding to a particular event (given the corresponding event attribute components 308) while in a particular situation (given the corresponding context element components 304). The exemplary user model component 502 is based on the exemplary service model component 202 described above, and again uses an XML representation, e.g., defined via XML document 508, for illustration purposes. As in the service model component 202 example shown above, Comments are demarcated in the example by "<!-- and -->" delimiters and are italicized for readability.

```
<usermodel>
<!-- Below are enumerated the subscriptions of this user -->
<subscribe service="SimpleCallService"/>
<!-- Below are enumerated the starting probabilities of -->
<!-- availability for this user with respect to the subscribed -->
<!-- service. The syntax is simplified here because only -->
<!-- one service is considered. More generally, the service ID -->
<!-- could be included in the "attribute" and "pairwise" elements. -->
<!-- The attributes MeetingAttr, LocationAttr, DayAttr, -->
<!-- PersonCategoryAttr, and RecencyAttr all use the distribution -->
<!-- "PointDistribution" because the possible values of these -->
<!-- attributes are enumerated. -->
<attribute type="FiniteRangeAttribute" name="MeetingAttr" weight =
        "0.7" distributionType="PointDistribution">
<value valn="none" prob="0.8"/>
<value valn="solo" prob="0.2"/>
<value valn="small" prob="0.3"/>
<value valn="formal" prob="0.1"/>
<value valn="public" prob="0.7"/>
</attribute>
<!-- The following attribute uses the distribution -->
<!-- "TimeDistribution" at the granularity of one hour. Thus -->
<!-- there are 24 possible values of the time attribute. Further -->
<!-- the nGramWidth is set to 5, which means that the two -->
<!-- preceding and the two succeeding hours are considered in -->
<!-- estimating the probability, making for smoother transitions. -->
<attribute type="FiniteRangeAttribute" name="TimeAttribute"
                distributionType="TimeDistribution" grain="hourly"
                nGramWidth=5>
</attribute>
<attribute type="FiniteRangeAttribute" name="LocationAttr" weight =
        "0.8" distributionType="PointDistribution">
<value valn="home" prob="0.8"/>
<value valn="work" prob="0.8"/>
<value valn="mobile" prob="0.9"/>
<value valn="elsewhere" prob="0.5"/>
</attribute>
<attribute type="FiniteRangeAttribute" name="DayAttr" weight = "0.9"
                distributionType="PointDistribution">
<value valn="weekday" prob="0.8"/>
<value valn="weekend" prob="0.3"/>
</attribute>
<attribute type="FiniteRangeAttribute" name="PersonCategoryAttr"
        weight = "0.9" distributionType="PointDistribution">
<value valn="close" prob="0.9"/>
<value valn="friend" prob="0.5"/>
<value valn="acquaintance" prob="0.3"/>
<value valn="stranger" prob="0.1"/>
<value valn="spammer" prob="0.7"/>
</attribute>
<attribute type="FiniteRangeAttribute" name="RecencyAttr" weight =
        "0.4" distributionType="PointDistribution">
<value valn="rare" prob="0.9"/>
<value valn="occasional" prob="0.5"/>
<value valn="never" prob="0.3"/>
</attribute>
<!-- The following is a two-dimensional distribution of -->
<!-- availability (as a function of the meeting attribute and -->
<!-- the person category attribute) viewed as a matrix.-->
<!-- The "rowWise" elements capture each row of the matrix. -->
<!-- The "columnWise" elements capture each cell of the matrix -->
<!-- (within a given row). -->
<pairwise pairDistributionType="PairDistribution"
            rowAttribute="MeetingAttr"
            columnAttribute="PersonCategoryAttr">
<rowWise rowValN="none">
<columnValue valN="close" prob="0.95"/>
<columnValue valN="friend" prob="0.85"/>
<columnValue valN="acquaintance" prob="0.84"/>
<columnValue valN="stranger" prob="0.83"/>
<columnValue valN="spammer" prob="0.05"/>
</rowWise>
<rowWise rowValN="solo">
<columnValue valN="close" prob="0.92"/>
<columnValue valN="friend" prob="0.74"/>
<columnValue valN="acquaintance" prob="0.61"/>
<columnValue valN="stranger" prob="0.29"/>
<columnValue valN="spammer" prob="0.04"/>
</rowWise>
<rowWise rowValN="small">
<columnValue valN="close" prob="0.81"/>
```

-continued

```
<columnValue valN="friend" prob="0.63"/>
<columnValue valN="acquaintance" prob="0.31"/>
<columnValue valN="stranger" prob="0.81"/>
<columnValue valN="spammer" prob="0.03"/>
</rowWise>
<rowWise rowValN="formal">
<columnValue valN="close" prob="0.45"/>
<columnValue valN="friend" prob="0.32"/>
<columnValue valN="acquaintance" prob="0.21"/>
<columnValue valN="stranger" prob="0.06"/>
<columnValue valN="spammer" prob="0.01"/>
</rowWise>
<rowWise rowValN="public">
<columnValue valN="close" prob="0.85"/>
<columnValue valN="friend" prob="0.71"/>
<columnValue valN="acquaintance" prob="0.51"/>
<columnValue valN="stranger" prob="0.43"/>
<columnValue valN="spammer" prob="0.02"/>
</rowWise>
</pairwise>
</usermodel>
```

In a third block 106 of the method 100 shown in FIG. 1, the service 300 is allowed to use the subscriber context information to generate a response to the event on behalf of the subscriber without the service 300 having direct access to the private subscriber information. The system shown in FIG. 2 includes means for allowing the service 300 to use the subscriber context information to generate a response to the event on behalf of the subscriber. For example, the system includes a service agent component 206, operatively coupled to the user agent component 204, that is configured to allow the service 300 to use the subscriber context information to generate a response to the event on behalf of the subscriber without the service 300 having direct access to the private subscriber information. Accordingly, in responding to the event, the private subscriber information is made only indirectly available to the service agent component 206 via the subscriber context information.

Each service 300 hosted via the platform 200 requires a corresponding service agent component 206 that provides the necessary application logic for delivering the service 300 to its subscribers. The service agent component 206 determines how to perform each specified action of the service 300. The service agent component 206 is also configured to maintain any internal state needed to carry out the service interaction with a subscriber, retrieving and updating the state as needed to carry out the actions requested by the subscriber. The service agent component 206 can operate proactively. That is, the service agent component 206 need not simply field requests from a subscriber, but can monitor the subscriber environment or interact with other service agent components 206 to determine whether the state the service agent component 206 maintains needs to be changed, whether a message needs to be sent to another agent component, or whether a notification message needs to be sent to the subscriber.

In an exemplary embodiment, services 300 are designed for delivery by the service agent component 206 in a "story" form. The story describes what is sometimes termed the storyboard for a smart service application. The story describes the various pages that may be designed (e.g., using hypertext markup language or HTML), served up to a subscriber's device, and then viewed by the subscriber during delivery of the service 300. The story also defines the actions that may be performed by the subscriber from each page, and the overall template and some of the contents of any resulting pages.

The service agent component 206 is provided with information describing how the story is to be processed, including how actions may need to be performed during service delivery. The service agent component 206 is configured to interact with the user agent, communicates with other service agent components 206, consults external information resources 208, and uses the story to render and serve up pages. What prompts the service agent component 206 to attempt to formulate a response for the subscriber may be an external event that the service agent component 206 observes. That is, a response may not be directly or immediately related to a subscriber request. There may be no response or multiple responses that result from a single subscriber request.

According to an exemplary embodiment, the service agent component 206 can be configured to access service-specific resources 506 used in delivering the service 300 to the subscriber. The service-specific resources 506 are made only indirectly available to the subscriber via the response to the service event. The service-specific information resources used by a service agent component 206 during service delivery may reside anywhere within network communication of the platform 200, and can be embodied in various forms, such as a MYSQL™ relational DBMS. Alternatively, service-specific information can be defined/provided to the service 300 via an XML document.

The service agent component 206 can access any such external service-specific resources 506 during service delivery. These resources can include public databases and private, persistent information stores that the agent uses to hold information pertinent to the service 300. In particular, these private persistent information stores could be used by the service agent component 206 to make its behavior persistent across instantiations of the service agent component 206 or even of the application server on which platform 200 is hosted, allowing the platform 200 and server to be "powered down." More generally, the external information resources need not be just static databases, but instead can be active resources such as analytical tools, enterprise applications, or legacy systems, or required by the service agent component 206 to deliver the service 300.

Importantly, the platform 200 supports the service agent component 206 having access to resources that are not part of the platform 200 itself offering a degree of privacy control to the service developers. Thus, if the service developer wishes to keep the implementations of some important information resources private and proprietary, the developer can choose to host such sensitive information separately on its own servers. To accomplish, the service developer need only configure its service agent component 206 to contact the appropriate external resource for information when at appropriate times.

According to another exemplary embodiment, the system can include a user directory component 504, operatively coupled to the user agent component 204, configured to store subscriber information used in delivering the service 300 to the subscriber. The subscriber information stored in the directory can include service subscription information, describing the various services 300 that subscribers have subscribed to. The system can include a service manager component configured to manage subscriptions. The service manager component can further be configured to ensure that the appropriate service agent components 206 are instantiated (e.g., one per subscriber, per subscription). The service manager components actions allows for the creation and cancellation of subscriptions to be automatically reflected in near real-time throughout the pool of installed service agent components 206.

The user directory component 504 can also be used to store context availability information, identifying the subscriber context and private subscriber information available in delivering the service 300. The user agent component 204, and in particular its situation constructor component, can use this information when determining the subscriber's current situation. The user directory component 504 can also be used to store context authorization information identifying the subscriber context and private subscriber information the subscriber has authorized the service 300 to use in delivering the service 300. Again, the situation constructor component can use this information when determining the subscriber's current situation.

The user directory component 504 and its subscriber configuration information can be maintained on a lightweight directory access protocol (LDAP) directory server, and accessed by the user agent component 204 via HTTP. Other system configuration information can be stored on the LDAP directory server and accessed by the various components of the platform 200. This system configuration information can include subscriber account information, locations (e.g., uniform resource locators or URLs, ports, and the like) of the various context element information sources 208 and other information sources that are required during service delivery, but whose configuration would be difficult to manage otherwise.

Figure 4:
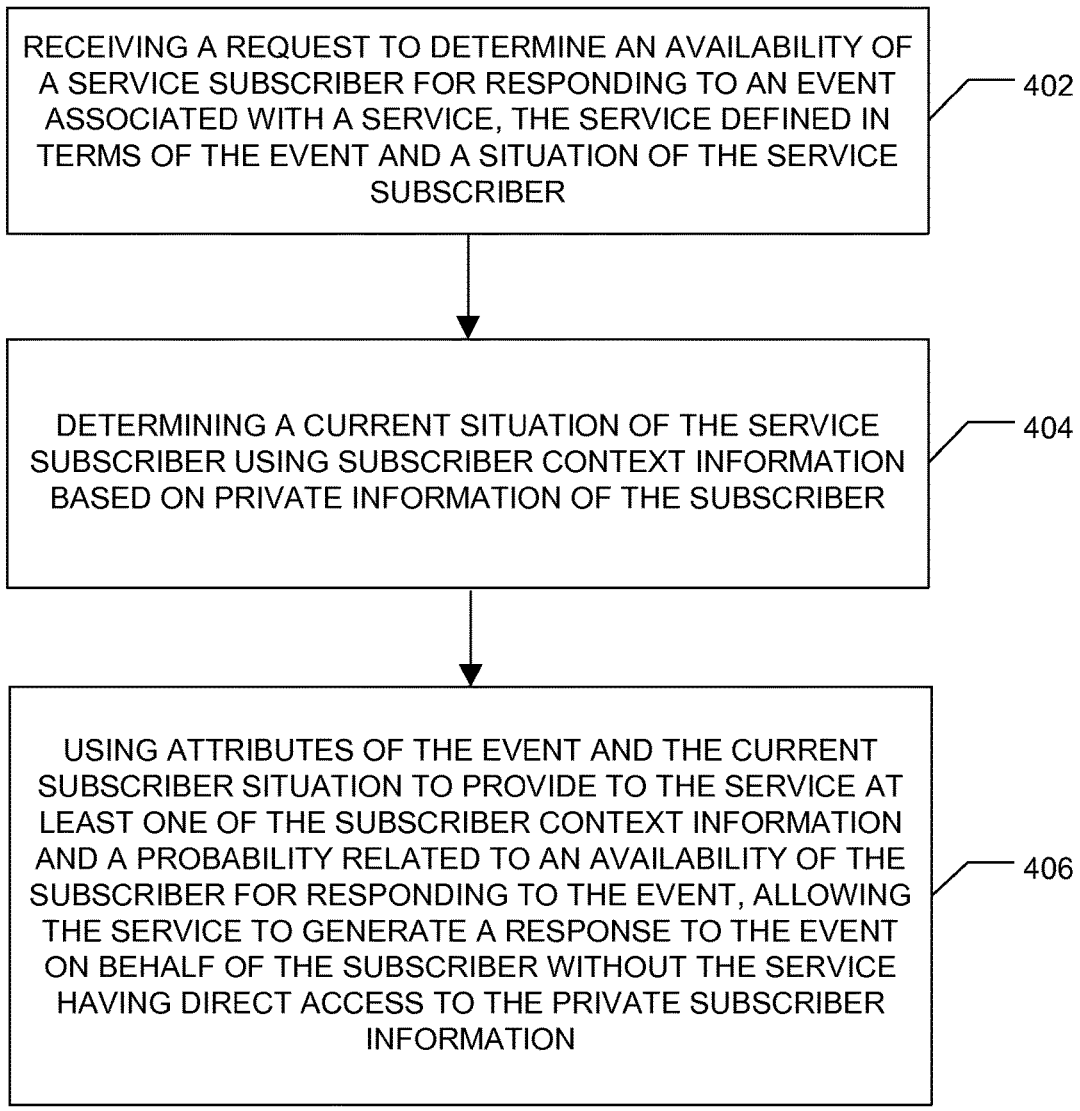
FIG. 4 is a flowchart illustrating a method for delivering smart services, according to an exemplary embodiment.
Figure 5:
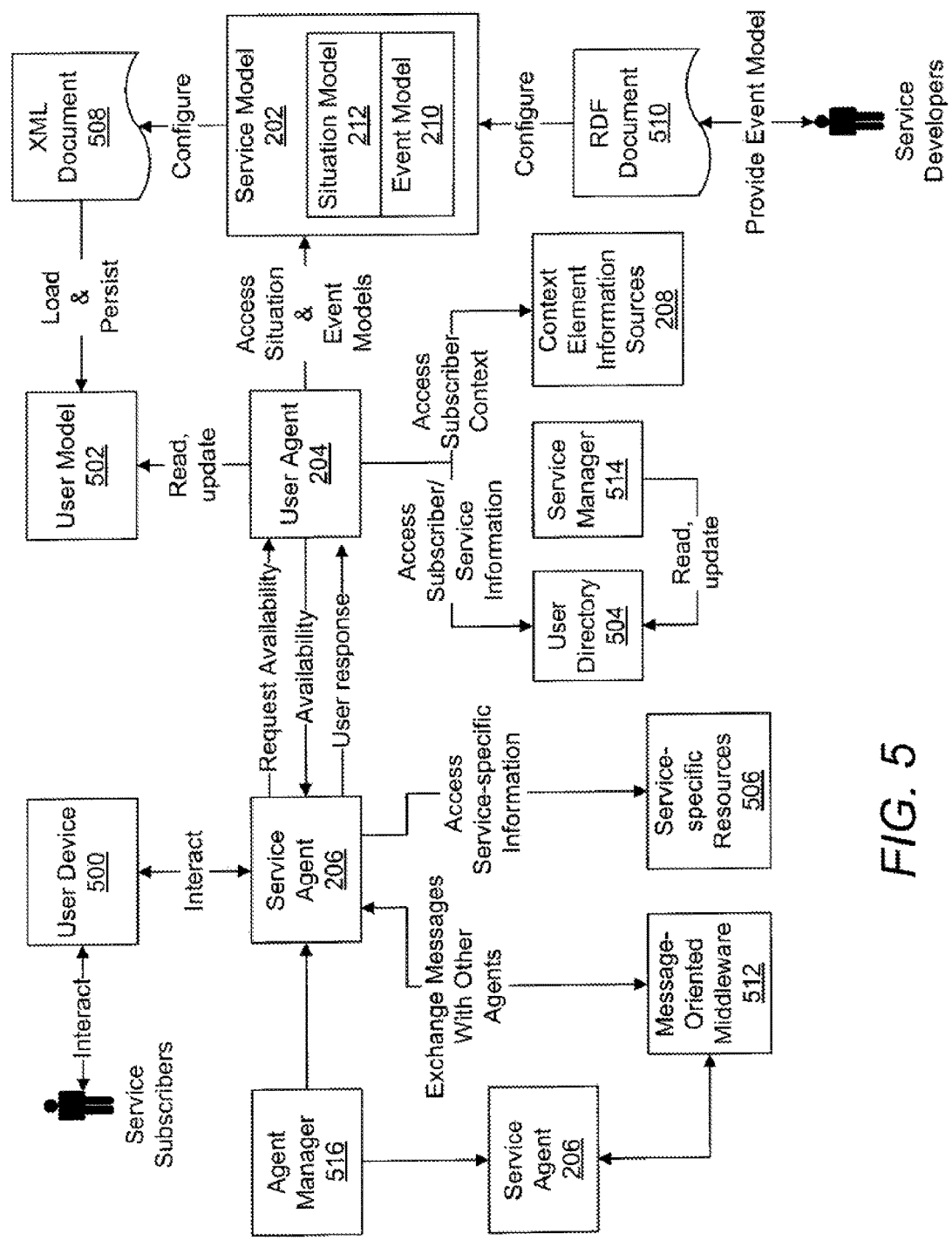
FIG. 5 provides a detailed view of a smart services middleware platform depicted in the exemplary system shown in FIG. 2 and other exemplary components for creating and delivering smart services, according to an exemplary embodiment.

FIG. 5 provides a detailed view of a smart services middleware platform 200 depicted in the exemplary system shown in FIG. 2 and other exemplary components for delivering smart services, according to an exemplary embodiment. As shown in the figure, a subscriber uses a device 500 to interact with a created service 300 via its service agent component 206, also referred to as a service instantiation. The interaction between a device 500 and a service instantiation occurs as a result the subscriber being subscribed to the given service 300. This interaction is termed "service delivery," and is described in greater detail in conjunction with the subject matter depicted in FIGS. 4-6 below.

FIG. 5 also depicts the manner in which certain of these components interact during the creation of smart services, and will be referenced for illustrating this particular function in the following paragraphs.

Prior to service creation, the various context element information sources 208 required by the service are linked to the platform 200. These information sources 208 will be accessible via the user agent component 204 provided for a particular service subscriber. User (or subscriber) account information, including the user's subscriptions and the authorizations granted for the utilization of their private information and whether that private subscriber information can be shared with the developers of various services 300 during service delivery is stored in the user directory component 504.

A service developer creates a smart service application to be hosted by the platform 200. The service developer develops the events and event attribute components 308 of its proposed service 300 that will form the event model component 210 for the service 300. The platform 200 supports complex events being defined via a declarative language, such as via the RDF document 510 shown in the figure. The developer, in conjunction with administrators of the platform 200, identifies the situation model component 212 (in essence, a set of subscriber context elements components) that it would like to use for the proposed service 300. The desired situation model component 212 can be combined with the already specified event model component 210 in the RDF document 510 to define the service model component 202. If the service model component 202 is to support a service that provides for adaptive learning during service delivery, the probability distributions necessary for such adaptive learning are specified. These probabilities can be related to the event type components 306 and context element components 304 in the definition of the service model component 202 provided via the RDF document 510.

The service developer then requests creation of the proposed service 300 based on the situation model component 212 and the event model component 210. The user directory 504 is consulted to determine whether the context element components 304 required for the service 300 are subscribed to and whether the subscriber has authorized their use by the service 300 during service delivery. The service 300 is then instantiated by updating the various internal data structures of the platform 200 with the service story and other service related information, and the subscriber's user model component 502 is configured according to the service model component 202. When a subscription is activated for the service 300, the appropriate service agent component 206 can be created and can interact with the corresponding user agent component 204 in delivering the service 300 to the subscriber.

Although in practice there can be fewer services 300 than subscribers, it is conceptually simplest to think of a service instantiation as being unique to a particular subscriber, as some aspects of the service's 300 behavior potentially depend upon the subscriber's subscriptions and user model component 502 as maintained by the platform 200.

Illustrative Example of Smart Service Creation

In the following example, elements of the service model component 202 and user model examples provided above are referred to in the context of creating a smart call service referred to as CallFilter. A situation type component 302 called PersonalSituation is defined in a situation model component 212 based on a first context element component 304 AroundWork (as described above) and a second context element component 304 DayOfWeek, corresponding to the seven days of the week. The situation type component 302 can represent one of many situation type components 302 supported by the platform 200, or alternatively, the service developer can suggest to the service provider that the situation type component 302 be supported by its situation model component 212.

The service developer defines a first event Call (corresponding to a traditional incoming phone call) and a second event ReturnCall (corresponding to a traditional incoming phone call whose caller is the callee of a previous outgoing call by this subscriber). The service developer wishes to create the service 300 CallFilter that treats calls and return calls differently for determining the subscriber's availability. This service 300 functions by treating a return call at a higher priority. The service 300 is defined to allow a weekday call to be returned on a weekday and a weekend call to be returned on a weekend. The service 300 allows ordinary calls to go through depending on if the caller is a business acquaintance of the callee and if the callee is in the vicinity of their place of work.

The service 300 can be instantiated if the platform 200 supports the PersonalSituation situation type component 302 (i.e., if the platform 200 supports the context element components 304 AroundWork and DayOfWeek). If the context element component 304 AroundWork is not explicitly supported, perhaps its constituent components, such as a position component (e.g., GPS), a mapping component (e.g., GIS), a works-at component (e.g., a corporate directory), and a distance component (e.g., a software component) are available via the platform 200. The AroundWork component can be computed as a composition of the position, map, and WorksAt components. Support for DayOfWeek can be provided via access to a calendar service.

To create a service instantiation for a particular user, the user directory component 504 is consulted to verify that the user has subscribed to the AroundWork and DayOfWeek context element components 304. After verifying that the user allows divulging his or her AroundWork status to the service application (DayOfWeek is publicly known and requires no authorization), an appropriate user model component 502 for the CallFilter service is created, allowing the service 300 to generate a response to a ReturnCall event based on subscriber context information defined by the PersonalSituation situation type component 302.

Delivery of Smart Services

A service 300 is delivered by a service provider based on a service definition (or instantiation) as previously created, events generated by the service as defined by the service developer, and the subscriber's context as observed by the service provider. As will be described in greater detail below, the provider receives an event from a service 300 and, using the service model component 202 described above, determines which service 300 the event is for and the subscriber situation associated with it. The service provider gathers appropriate subscriber context information for determining a current situation of the subscriber and responds to the event on behalf of the subscriber. The response can include sending the values of the various context elements that constitute the subscriber's current situation to the service 300 or can forward information, including information related to the event, to the subscriber.

An exemplary method 400 for delivering smart services is illustrated by the flowchart shown in FIG. 4. A system for carrying out the method 400 shown in FIG. 4 for delivering smart services is depicted in FIGS. 5 and 6, portions of which will be referred to below in describing the method 400.

In a first block 402 of the exemplary method 400, a request is received to determine an availability of a service subscriber for responding to an event associated with a service. As described above, the service is defined in terms of the event and a situation of the service subscriber. The system shown in FIG. 5 includes means for receiving a request to determine an availability of a service subscriber for responding to an event associated with a service. For example, the exemplary system shown in FIG. 5 includes the user agent component 204, described above, configured to receive a request to determine an availability of a service subscriber for responding to an event associated with a service. As shown in the figure, the request can be received from the service agent component 206 after determining, based on its internal logic and programming, that information related to the event should be presented to the subscriber. The service agent component 206 includes values for the various event attributes in the request sent to the user agent component 204.

In a second block 404 of the exemplary method 400, a current situation of the service subscriber is determined using subscriber context information based on private information of the subscriber. The system shown in FIG. 5 includes means for determining a current situation of the service subscriber is using subscriber context information based on private information of the subscriber. For example, the user agent component 204 is configured to determine a current situation of the service subscriber using subscriber context information based on private information of the subscriber. As described above, the user agent component 204 can include a situation constructor component (not shown) configured to obtain "real-time" information from the context element information sources 208 to construct the user's current situation. The situation constructor can be requested to determine the subscriber's current situation whenever the service 300 (via its service agent component 206) has the need to access some context element component 304 of the subscriber's situation or to determine the subscriber's predicted response to a particular event.

In a third block 406 of the method 400, attributes of the event and the current subscriber situation are used to provide to the service at least one of the subscriber context information and a probability related to an availability of the subscriber for responding to the event. This allows the service 300 to generate a response to the event on behalf of the subscriber without the service 300 having direct access to the private subscriber information, e.g., context element information sources 208. The system of FIG. 5 includes means for using attributes of the event and the current subscriber situation to provide to the service at least one of the subscriber context information and a probability related to an availability of the subscriber for responding to the event.

For example, the exemplary system shown in FIG. 5 includes a user model component 502, operatively coupled to the user agent component 204. The user model component 502 is configured to define at least one of the subscriber context information and a probability related to an availability of the subscriber for responding to the event in terms of attributes of the event and the situation defining the service. For example, the user model component 502 depicted above includes entries defining probability values in terms of attributes of an event, such as whether a caller is a stranger, e.g., "<value valn="stranger" prob="0.1"/>," and probability values in terms of attributes of a subscriber's situation, such as whether the subscriber is located at work, e.g., "<value valn="work" prob="0.8"/>."

The user agent component 204 is configured to provide at least one of the subscriber context information and the probability related to the availability of the subscriber for responding to the event to the service 300, allowing the service 300 to generate a response to the event on behalf of the subscriber without the service 300 having direct access to the private subscriber information, e.g., the context element information sources 208. The user agent component 204 can be configured to forward subscriber context information, as defined by the situation model 212, based on information included in the context element information sources 208 to the service agent component 206 for use by the service in responding to the event. Instead of, or in addition to, the user agent component 204 can be configured to determine a probability that the subscriber is available for responding to the event using information included in the user model component 502, and the forward this availability information to the service agent component 206 for use by the service in responding to the event. Techniques for computing the probability that the subscriber is available for responding to the event are described in greater detail in the portion below titled "ADAPTIVELY LEARNING USER PREFERENCES FOR SMART SERVICES."

According to an exemplary embodiment the subscriber context information can be filtered before providing the subscriber context information to the service, allowing the service to generate the response on behalf of the subscriber using the filtered subscriber context information. For example, the user agent component 204 can be configured to filter the subscriber context information using filtering information included in the user model component before providing the subscriber context information to the service. The subscriber's context element components 304 can be filtered so that the subscriber information the components represent can be revealed to a particular service agent component 206 for a particular event type component 306, together with its corresponding event attribute components 308. For example, in the case of context information related to a location of the subscriber, the user model component 502 can be configured to allow the user agent component 204 to inform a service 300 of the subscriber's location precisely if the subscriber is at work, but to replace all other subscriber locations with a generic descriptor of "not at work."

According to an exemplary embodiment, the response to the event can be generated based on the at least one of the subscriber context information and the probability related to an availability of the subscriber for responding to the event. For example, the service agent component 206 can be configured to generate the response including information related to the event for presentation to the subscriber. Alternatively, the service agent component 206 can be configured to respond to the event on behalf of the subscriber without forwarding information related to the event to the subscriber, thus allowing the service to operate in a more autonomous manner.

Figure 6A:
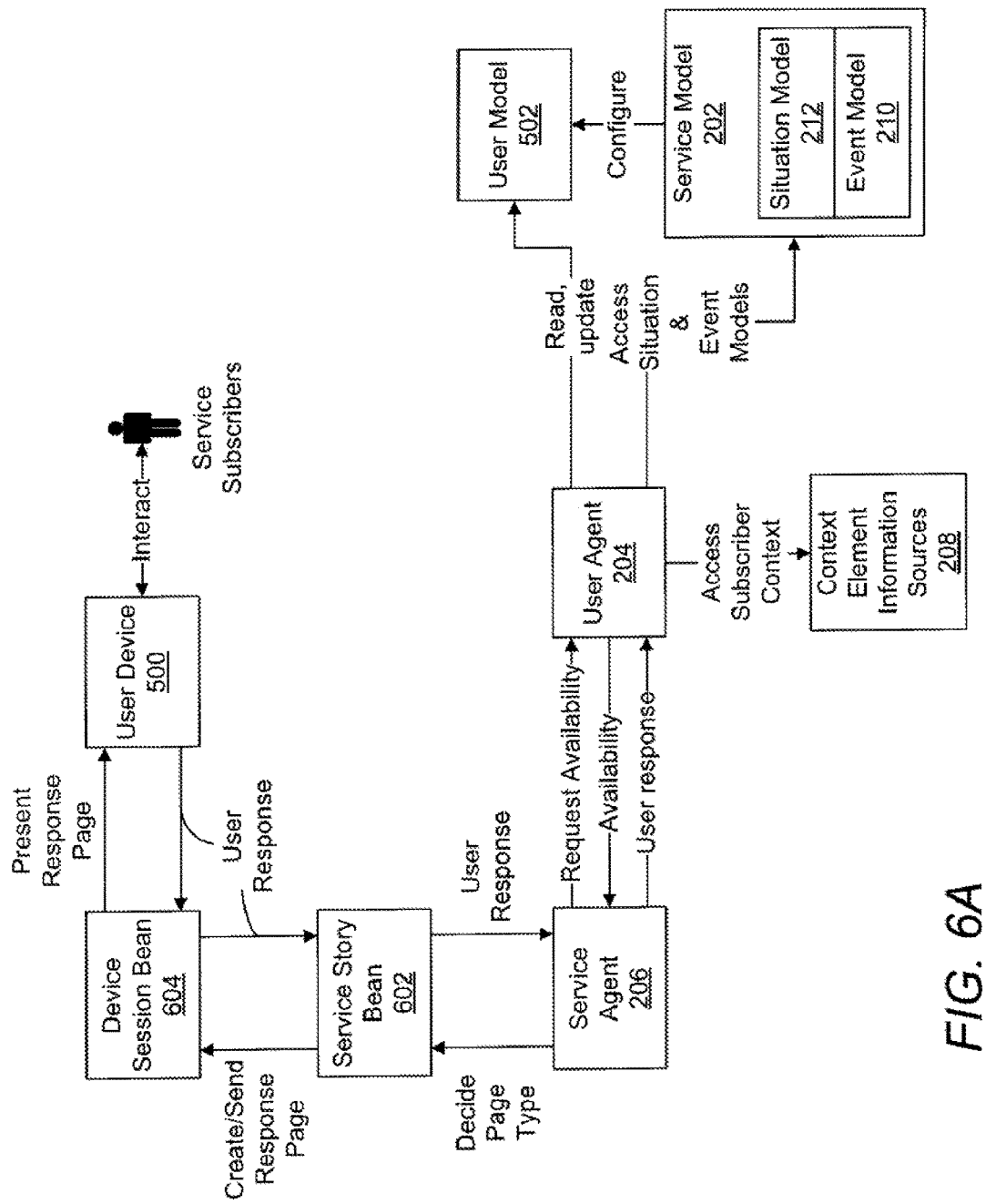
FIGS. 6A and 6B depict detailed views of a portion of the system shown in FIG. 5, and illustrate alternative embodiments for the generation of a response including information related to an event for presentation to a service subscriber.

FIG. 6A depicts a detailed view of portion of the system shown in FIG. 5, suitable for illustrating the generation of a response including information related to the event for presentation to the subscriber. Recall from above that services 300 may be designed for delivery by the service agent component 206 in a story form. The story describes the various pages that may be designed, served up to a subscriber's device, and then viewed by the subscriber during delivery of the service 300. The story also defines the actions that may be performed by the subscriber from each page, and the overall template and some of the contents of any resulting pages.

As shown in the figure, the system can include a service story bean component 602 configured to construct a response page (e.g., an HTML encoded page) for presentation by the device 500 (e.g., via a browser) based on the response to the event generated by the service agent component 206. The service story bean component 602 constructs the response page in accordance with the story associated with the service 300. The service story bean component 602 may also be configured to process "simple" requests locally. As used here, a "simple" request is a request, e.g., from the device 500, that does not require external data or require an action by the service agent component 206. For such requests, the service story bean component 602 can construct a response page itself. Again, these pages are constructed based on the specification of the story that the given service 300 requires.

Once the response page is created, the service story bean component 602 is configured to forward the page to a device session bean component 604. The device session bean component 604 is configured to translate the response page, created by the service story bean component 602, into a form suitable for presentation to the subscriber via the device 500. The device session bean component 604 then forwards the translated response page to the device 500 for presentation to the subscriber. The device session bean component 604 can also be configured to store the translated response page in a queue (e.g., when the device 500 is "offline") and send the stored response page to the device 500 after receiving a polling request indicating that the device 500 is "online," and ready to receive the stored response page for presentation to the subscriber.

The device session bean component 604 is further configured to receive requests from the subscriber via the device 500 and route the requests to the appropriate components of the platform 200. Some requests from a device 500 may not be explicit user requests, but instead may be requests generated by the device 500 itself, such as when the device 500 polls the service 300 to determine in any outstanding service alerts or notifications exist. Typically, the device session bean component 604 is configured to process three types of requests from the device 500. These include a request from the device 500 that indicates that the subscriber/device 500 has come "online." In the case, the device session bean component 604 forwards a request to an agent manager 514 configured to ensure that the requisite service/user agents are activated for the subscriber.

A second type of request from the device 500 indicates that the device 500 is polling for any alert pages or notifications issued by the service 300. These requests can be periodically generated by the device 500 without requiring direct subscriber involvement. Alternatively, this type of device 500 request can indicate that the device 500 is seeking a page from the service history—analogous to a page accessible via the "back" function of a conventional browser. Such a request would generally be initiated by the subscriber. For a polling-type request, the device session bean component 604 sends back any alert pages that might exist in a queue for the subscriber. For a history-type request, the device session bean component 604 can looks up the desired page from a history data structure for presentation to the subscriber, and update the data history data structure appropriately.

The third type of request from the device 500 indicates that the subscriber would like to perform some service-specific action for a designated service. With this type of request, the device session bean component 604 verifies the user's subscription for the designated service, e.g., by consulting the user directory component 504. Next, the device session bean component 604 invokes the necessary service story bean component 602 for the given service. As described above, the device story bean component 602 can process "simple" requests on its own (e.g., without involving the service agent component 206) if the requests do not involve modifying any backend information. That is, if the requests do not involve changing the state of the service. If there are more complex actions involved with the request, the service story bean component 602 invokes the service agent component 206, which processes the requests in the manner described above.

Figure 6B:
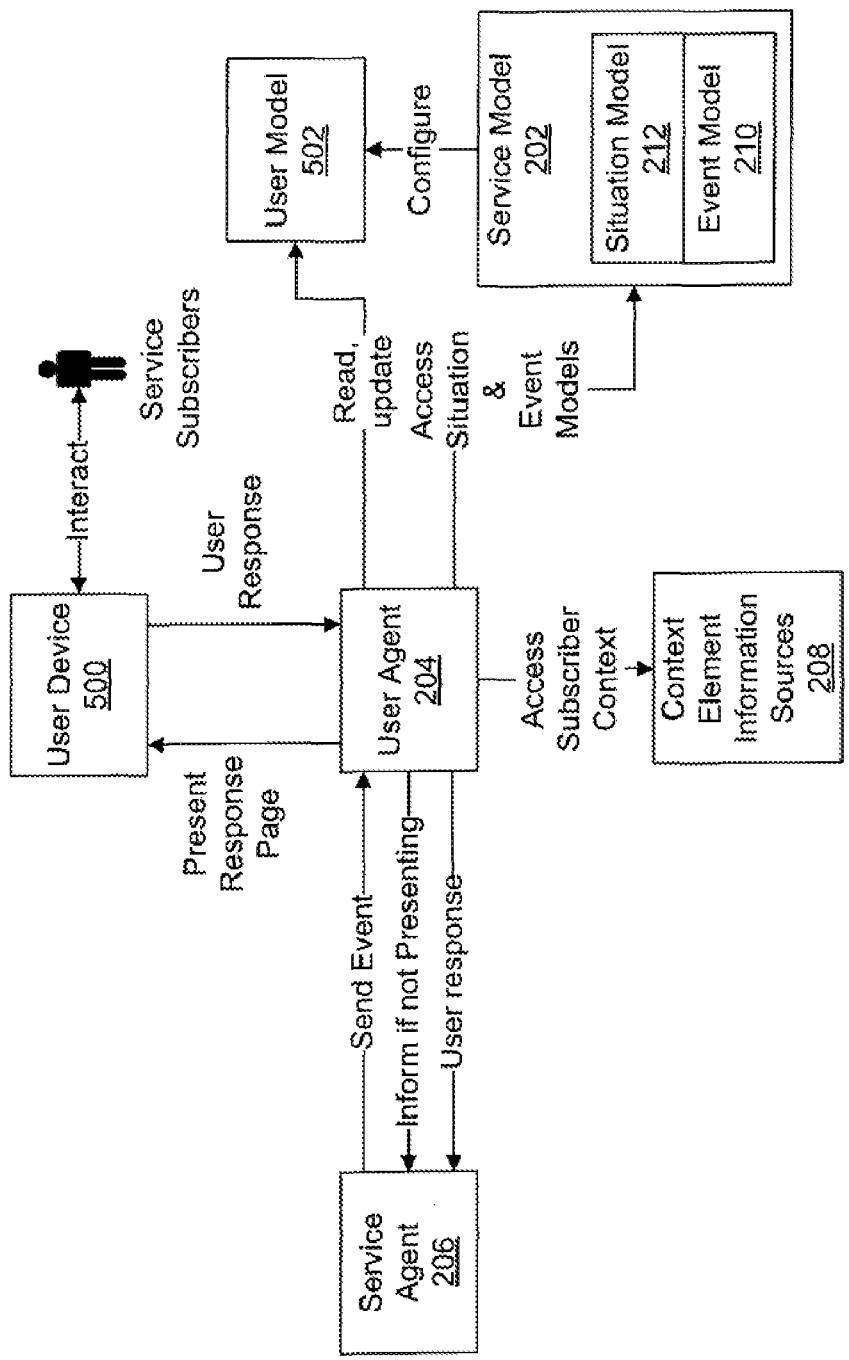

FIG. 6B depicts an alternative arrangement for delivering smart services. Unlike the embodiment depicted in FIGS. 5 and 6A, where the service agent component 206 generates a response to the event, in the arrangement shown in FIG. 6B, the user agent component 204 is configured to present the response page to the subscriber. Consequently, rather than the service agent component 206 sending a request for determining the availability of the service subscriber for responding to the event to the user agent component 206, instead the event itself, along with values for its attributes, are sent from the service agent component 206 to the user agent component 204.

In comparing the arrangements of FIGS. 6A and 6B, one can see the arrangement depicted in FIG. 6A places some degree of trust in the service agent component 206 that it will not generate events for the subscriber without first consulting the user agent component 204 or that the service agent component 206 will consult, but ignore decisions of the user agent component 204. These concerns could be addressed, for example, by configuring the user agent component 204 to provide a token to the service agent component 206 and then configuring the device session bean component 604 to verify that a token has been provided prior to contacting the subscriber.

In contrast, the arrangement of FIG. 6B places the user agent component 204 at the center of the service delivery process. In this approach, the user agent component 204 is responsible for interactions with the subscriber, thus protecting the subscriber from receiving unsolicited or unauthorized information from the service developer. With the alternative arrangement, the user agent component 204 can apply its knowledge in determining how to best present an event to the user, e.g., via audio, visual, or other appropriate modality. Since it is the user agent component 204 that interacts with subscriber device 500 in the alternative arrangement, the user agent component 204 must somehow know about the service 300 being delivered to be able to interact with subscribers to those services in a natural manner. Practically, this requires the user agent component 204 to be configured to interact with the service story bean component 602 directly or be configured to process service stories directly.

A tradeoff between the two approaches depicted in FIGS. 6A and 6B concerns the ease of which prospective service developers are able to build and deploy their services via the platform 200. The arrangement shown in FIG. 6A has certain advantages in that service developers will likely be familiar with writing service story bean components 602 that function, as required in the arrangement, in cooperation with the service agent component 206. These advantages are borne out because there exist potentially stronger dependencies between the service story bean component 602 and the service agent component 206 than likely exist between the service story bean component 602 and the user agent component 204. Since the service story bean component 602 and the service agent component 206 interact directly and both would likely be coded by the same team of developers, it would likely be easier for these developers to design and maintain these components to deliver the service.

An alternative approach to the arrangement shown in FIG. 6B allows the user agent component 204 to interact directly with the service story bean component 602 to determine how to best present the response to the event to the subscriber. This approach has the effect of requiring interactions between the service story bean component 602 and both the service agent component 206 and user agent component 204, and thus could be potentially more complex than the approach used by the arrangement shown in FIG. 6A.

According to an exemplary embodiment, the method 400 can further include receiving feedback from the subscriber in response to a presentation of the response to the subscriber. For example, as shown in FIGS. 5 and 6A, the user agent component 204 can be configured to receive feedback from the subscriber via the service agent component in response to a presentation of the response to the subscriber. Both the device session bean component 604 and service story bean component 602 are configured to forward feedback, received from the subscriber, from the device 500 to the service agent component 206, which in turn, forwards the subscriber's response to the user agent component 204 for further processing.

In a related embodiment, the probability related to the availability of the subscriber for responding to the event is updated based on the feedback received from the subscriber. For example, the user agent component 204 can be configured to update the user model component 502, including the probability related to the availability of the subscriber for responding to the event, based on the feedback received from the subscriber. Techniques for updating the user model component 502 are described in greater detail in the portion below titled "ADAPTIVELY LEARNING USER PREFERENCES FOR SMART SERVICES."

The method 400 can also include accessing service-specific resources used in delivering the service to the subscriber. The service-specific resources are made only indirectly available to the subscriber via the response to the service event. For example, as described above, the service agent component 206 can be configured to access service-specific resources 506 used in delivering the service 300 to the subscriber. The service-specific resources 506 are made only indirectly available to the subscriber via the response to the service event. The service-specific information resources used by a service agent component 206 during service delivery may reside anywhere within network communication of the platform 200, and can be embodied in various forms, such as a MYSQL™ relational DBMS. Alternatively, service-specific information can be defined/provided to the service 300 via an XML document.

In another exemplary embodiment, information related to the event or the service can be exchanged with an agent of another service. For example, the arrangement shown in FIG. 5 includes a second service agent component 206 associated with another service and a message-oriented middleware component 512 configured to exchange information related to the event or the service with the second service agent component 206. The behavior of the second service agent component 206 receiving a request from the first service agent component 206 is analogous to that of the first service agent component 206 receiving a request from the subscriber via the device 500, except that whether second service agent component 206 generates a response depends on whether the second service agent component 206 is authorized to interact with the first querying agent component 206.

According to another exemplary embodiment, when an event occurs, the service associated with the event is identified, and the identified service is requested to respond to the event on behalf of the subscriber. For example, the arrangement shown in FIG. 5 includes an agent manager component 516 configured to identify the service 300 associated with the event and to request the identified service 300 to respond to the event on behalf of the subscriber.

The method 400 can further include verifying that the subscriber is subscribed to the service by accessing a user directory for storing subscriber information including service subscription information identifying a subscription to the service for the subscriber. For example, the exemplary system shown in FIG. 5 includes a service manager component 514, coupled to a user directory component 504 for storing subscriber information including service subscription information identifying a subscription to the service for the subscriber, the service manager component configured to verifying the subscriber is subscribed to the service.

Illustrative Example of Smart Service Delivery

Consider the example of a "call-tagging" service, in which a user, Alice, may place a tag request for another user, Bob, to inform Alice that Bob is available to receive her call. Alice's tag-service agent component 206 sends a request to Bob's tag-service agent component 206. Assuming that the appropriate authorizations for using the service 300 and tracking the subscriber context information exist for both parties, Bob's tag-service agent component 206 monitors Bob's situation or determines Bob's predicted availability via Bob's user agent component 204 and corresponding user model component 502. If Bob's user agent component 204 determines that Bob would be available for a call from Alice, Bob's tag-service agent component 206 so informs Alice's tag-service agent component 206.

Alice's tag-service agent component 206 would then (similar to the process described above) verify if Alice is likely to be available for the proposed call. If so, Alice's tag-service agent component 206 generates a response to Alice via the tag service story bean component 602 and the device session bean component 604. If not, Alice's tag-service agent component 206 would generate another request to Bob's tag-service agent component 206, and the process continues, appropriately.

A more detailed description of such a call-tagging service, suitable for implementation using the techniques described here, are described in U.S. patent application Ser. No. 11/536,232, titled "SYSTEM AND METHOD FOR PROVIDING A TASK REMINDER", filed Sep. 28, 2006, commonly owned with this application, the entire disclosure of which is here incorporated by reference.

Adaptively Learning User Preferences for Smart Services

Figure 7:
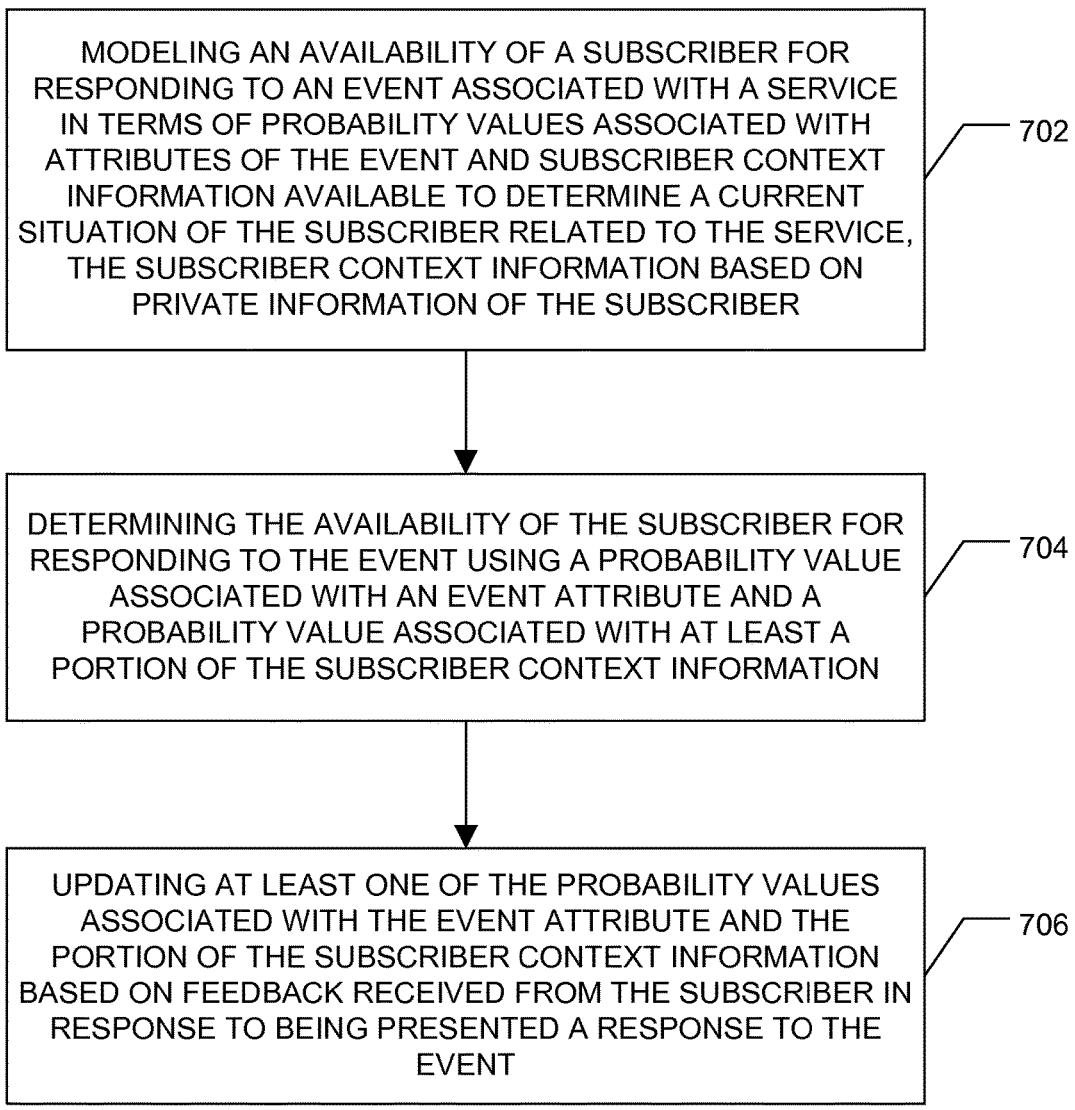
FIG. 7 is a flowchart illustrating a method for adaptively learning user preferences for smart services, according to an exemplary embodiment.

An exemplary method 700 for adaptively learning user preferences for smart services is illustrated by the flowchart shown in FIG. 7. A system for carrying out the method 700 shown in FIG. 7 is depicted in FIGS. 5 and 6, portions of which will be referred to below in describing the method 400.

In a first block 702 of the flowchart shown in FIG. 7, an availability of a subscriber for responding to an event associated with a service is modeled in terms of probability values associated with attributes of the event and subscriber context information available to determine a current situation of the subscriber related to the service. The subscriber context information is based on private information of the subscriber. The system of FIG. 5 includes means for modeling the availability of the subscriber for responding to an event associated with a service in terms of probability values associated with attributes of the event and subscriber context information available to determine a current situation of the subscriber related to the service.

For example, as described above, the exemplary system shown in FIG. 5 includes a user model component 502, operatively coupled to the user agent component 204. The user model component 502 is configured to define at least one of the subscriber context information and a probability related to an availability of the subscriber for responding to the event in terms of attributes of the event and the situation defining the service. For example, the user model component 502 depicted above includes entries defining probability values in terms of attributes of an event, such as whether a caller is a stranger, e.g., "<value valn="stranger" prob="0.1"/>," and probability values in terms of attributes of a subscriber's situation, such as whether the subscriber is located at work, e.g., "<value valn="work" prob="0.8"/>."

According to an exemplary embodiment, the user model component 502 can be configured to include a single-attribute probability distribution assigned to the event attributes and portions of the subscriber context information that are unrelated in the user model component 502 to other event attributes or other portions of the subscriber context information. The user model component 502 can also be configured to include a dual-attribute probability distribution assigned to pairs among the event attributes and portions of subscriber context information related to one another in the user model component.

The probability distributions can be represented explicitly in the user model component 502 as objects. An API can be provided that enables querying and adjusting probabilities (e.g., via the user agent component 204) for all distributions. Functions of the API can include getting a probability value (e.g., by specifying one attribute for a single-attribute distribution and two attributes for a dual-attribute distribution). The API also supports adjusting a probability value (again by specifying one attribute for a single-attribute distribution and two attributes for a dual-attribute distribution). It is in the adjusting of the probabilities of the user model component 502 that the core learning of user preferences for smart services takes place. The API also supports setting a probability value (once again, by specifying one attribute for single-attribute distribution and two attributes for a dual-attribute distribution). This function of the API allows a service administrator to reset some or all of the probability distributions, and is generally not used during normal service delivery.

The single-attribute probability distribution can include a point distribution. The point distribution includes a one-dimensional array of probabilities having one element for each possible probability value of an associated event attribute or portion of the subscriber context information. With a point distribution, successive probability values stored in the array are unrelated to one another. An example of a point distribution is provided in the user model component 502 depicted above, in which distribution for a subscriber location is defined in the model 502 to be:

```
<attribute type="FiniteRangeAttribute" name="LocationAttr" weight =
    "0.8" distributionType="PointDistribution">
<value valn="home" prob="0.8"/>
<value valn="work" prob="0.8"/>
<value valn="mobile" prob="0.9"/>
<value valn="elsewhere" prob="0.5"/>
</attribute>
```

The single-attribute probability distribution can also include an n-gram distribution including a one-dimensional array of probabilities having one element for each possible probability value of an associated event attribute or portion of the subscriber context information. With the n-gram distribution, successive probability values stored in the array are related to one another. For example, if a subscriber is available for an event having an attribute value of V3, then using the n-gram distribution, we can predict that the subscriber may be available (albeit to a reduced degree) at attribute values V2 and V4, and also available (at a further reduced degree) at attribute values V1 and V5.

The n-gram distribution is defined in terms of its width, decay factor, and center weight. The width of the distribution is preferably an odd positive, natural number. Typically, the width will be smaller than the dimension of the array of probabilities in the distribution itself (e.g., the number of attribute values in the distribution). The center weight of the distribution is preferably a real number ranging from 0 to 1, and has a default value of 1. The decay factor is used in the distribution to indicate how steeply the probabilities of the distribution fall off from that of the center value. Typically, the decay factor is a real number having a default value of 2. The midpoint of the distribution is defined ((width−1)/2), truncating if necessary to ensure that the midpoint is an integer value. A sum of the distribution, nGramSum, is defined to be the sum of all the weights included in the distribution.

Consider, for example, an n-gram distribution for event of subscriber context information element having a width of 5, a center weight of 1, a decay factor of 2, and a midpoint of 2. The distribution can be represented as a one-dimensional array of weights with the value given to the midpoint index of the distribution being the center weight. The value given to an arbitrary index in the distribution that is offset (to the left or to the right) from the midpoint by some a natural number, N, is given the equation center weight/(decay factor$^N$). Thus, the weights for the exemplary distribution corresponding to indices 0 through 4 (i.e., width=5) can be determined as:

| 0    | 1   | 2 | 3   | 4    |
|------|-----|---|-----|------|
| 0.25 | 0.5 | 1 | 0.5 | 0.25 |

The sum of the distribution, nGramSum, is equal to 1+0.5+0.5+0.25+0.25=2.5. That is, 40% of the total weight is on the midpoint, 20% on each of the indices one step away from the midpoint, and 10% on each of the indices two steps away from the midpoint.

To determine a probability for a particular attribute value in the distribution, the entire distribution array is filtered through the n-gram array. First a variable for holding the resulting probability is initialized to 0. Next, the index of the requested attribute value is placed at the center of the n-gram array being used. For example, if an array of attribute values in the distribution has indexes 0 through 6 (i.e., 7 attribute values) and the n-gram width is equal to 3, then for determining the resulting probability associated with index value 5 of the distribution, the n-gram array is centered at index value 5 and is considered to cover index values 4, 5, and 6 of the distribution. If necessary, the n-gram is considered to circle around the attribute value distribution. Thus, in the above example, for index value 6 of the distribution, the n-gram array is centered at index value 6 and is considered to cover index values 5, 6, and 0 of the attribute distribution. Hence, the n-gram distribution is said to circle around the array of attribute values.

Once the attribute and n-gram arrays are aligned, the resulting probability associated with a particular index is determined by calculating the weighted sum of the distribution probabilities as weighted by the n-gram weights. That is, for each index in the n-gram array, Multiply a particular n-gram weight with the corresponding distribution value;

Add the above product to the result variable (initialized to 0); and

Return the resulting sum of products divided by nGramSum.

The single-attribute distribution can also include a time distribution including a one-dimensional array of probabilities having one element for each possible probability value of an associated event attribute or portion of the subscriber context information, wherein successive probability values stored in the array are related to one another based on time. The time distribution is a specialized case of the n-gram distribution described above. For hourly granularity, the width of the distribution is "24" and the attribute values are automatically generated as ranging from "0" to "24".

The dual-attribute probability distribution can include a pairwise distribution, based on at least one of the point, n-gram, and time distributions. The pairwise distribution includes a two-dimensional array of probabilities having one element for each possible probability value of an associated pair among the event attributes and portions of the subscriber context information related to one another in the user model component. The exemplary user model component 502 depicted above includes an example of a pairwise distribution relating a type of meeting (situation attribute) with a type of caller (event attribute).

In a second block 704 of the method 700, the availability of the subscriber for responding to the event is determined using a probability value associated with an event attribute and a probability value associated with at least a portion of the subscriber context information. The system of FIG. 5 includes means for determining the availability of the subscriber for responding to the event using a probability value associated with an event attribute and a probability value associated with at least a portion of the subscriber context information. For example, the user agent component 204 is configured to determine the availability of the subscriber for responding to the event using a probability value associated with an event attribute and a probability value associated with at least a portion of the subscriber context information.

In determining the availability of the subscriber for responding the event, the user agent component 204 is configured to first Identify all of the context element components 302 (or situation attributes, such as location, presence, and the like) used to determine a current situation of the subscriber (but only those that meet the service provider's and subscriber's constraints, as described above) and all of the attributes of the given event (for example, a caller name, a relationship with the caller, and the like).

Next, a first variable, proAvailability, is defined as a real number ranging from 0 to 1 that represents the odds of the subscriber being available for responding to the particular event. The first variable, proAvailability, is initialized to 1. Next, a second variable, antiAvailability, is defined as a real number ranging from 0 to 1 that represents the odds of the subscriber being unavailable for responding to the event. The second variable, antiAvailability, is also initialized to 1.

For each attribute from the overall set of attributes identified above, determine if a single-attribute distribution for that attribute has been defined. If one has, then determine the probability value, probMultiple, assigned by the distribution for a current value of the particular attribute. After determining the probability value, probMultiple, for the current value of the attribute, update the first variable, proAvailability, to be the product of the previous value of proAvailability and probMultiple. Next, update the second variable, antiAvailability, to be the product of the previous value of antiAvailability and (1−probMultiple).

For each pair of attributes from the overall set of attributes identified above, determine if a dual-attribute distribution for that pair of attributes has been defined. If one has, then determine the probability value, probMultiple, assigned by that distribution for the current values of the particular pair of attributes. Next, update the first variable, proAvailability, to be the product of the previous value of proAvailability and probMultiple. Also, update the second variable, antiAvailability, to be the product of the previous value of antiAvailability and (1−probMultiple).

After performing the above calculation for each of the identified attributes, the resulting odds can be converted in a probability by dividing a final value of the first variable, proAvailability, by the sum of the final values of the first and second variables, e.g., (proAvailability+antiAvailability).

The following numerical example will help to further understand the above-described technique for determining the subscriber's availability for responding to the event. Consider a user model component 502 having one context element attribute, day-of-week, and one event attribute, relationship-with-caller. The first and second variables are initialized to one, thus, proAvailability=1 and antiAvailability=1. Note that the ratio proAvailability:antiAvailability captures the odds of the user being available for the event. Initially, the odds for:against are 1:1, because nothing has been learned regarding the subscriber's preferences.

For a first iteration, consider that the current value of the attribute day-of-week has a probability, probMultiple, of ¾. Updating the first and second variables yields proAvailability=1*¾=¾, and antiAvailability=1*¼=¼. Consider further that the current value of the attribute relationship-with-caller has a probability, probMultiple, of ⅔. Updating the first and second variables again yields proAvailability=¾*⅔=½, and antiAvailability=¼*⅓=1/12. Consider further that no dual-attribute distributions have been defined. After the first iteration of attributes, the odds are now ½:1/12 or 6:1. Converting these odds into probabilities yields (½/(½+1/12)) or 6/7.

In a third block 706 of the method 700, at least one of the probability values associated with the event attribute and the portion of the subscriber context information is updated based on feedback received from the subscriber in response to being presented a response to the event. The system shown in FIG. 5 includes means for updating at least one of the probability values associated with the event attribute and the portion of the subscriber context information based on feedback received from the subscriber in response to being presented a response to the event. For example, the user agent component 204 is configured to update at least one of the probability values associated with the event attribute and the portion of the subscriber context information based on feedback received from the subscriber in response to being presented a response to the event.

In updating the availability of the subscriber, the user agent component 204 is configured to multiply the resulting probability that the subscriber is available for responding to the event by a third variable representing either a rate of learning from positive feedback or a rate of learning from negative feedback from the subscriber. The user agent component 204 then adds the product of the resulting probability and the third variable to a fourth variable representing circumstances where the subscriber feedback indicates the subscriber is either available or unavailable for responding to the event. Finally, the user agent component 204 is configured to assign the quotient of the sum of the product and the fourth variable and a sum of the third variable and a constant to each of the event attributes, portions of the subscriber context information, and pairs thereof used in determining the resulting probability that the subscriber is available for responding to the event.

The following example further illustrates the techniques performed by the user agent component 204 in updating the user model component 502. First, a variable, most_availability, is defined to represent circumstances where the subscriber indicates being available for responding to the event. The variable most_availability should be a real number ranging form 0 to 1, and should be initialized to 1.

Another variable, least_availability, is defined to represent circumstances where the subscriber indicates he or she is unavailable for responding to the event. The variable least_availability should also be a real ranging from 0 to 1, but should be initialized to 0.

Another variable, learningDamperYes, is defined to represent the rate of learning from receiving positive feedback from the subscriber (i.e., when the subscriber is available for responding to the event). This variable is initialized to 0.5. Yet another variable, learningDamperNo, is defined to represent the rate of learning from receiving negative feedback from the subscriber (i.e., when the subscriber is unavailable for responding to the event). This variable is also initialized to 0.5. If the feedback received from the subscriber is positive, then define the variable targetAvailability as most_availability and the variable effectiveDamper as learningDamperYes. Otherwise, define the variable targetAvailability as least_availability and the variable effectiveDamper as learningDamperNo.

Next, calculate a new probability value for each distribution value of the user model component 502 used in determining the subscriber's availability for the given event in the calculation above. Each new probability value, newProb, can be a nominal adjusted probability of the subscriber's availability for responding to the event, and can be calculated as a convex sum of the variables oldProb and targetAvailability using the following equation:

newProb=(oldProb*effectiveDamper)+targetAvailability)/(effectiveDamper+1)

After determining each probability value, the user agent component 204 can use the API for the given distribution type to adjust the corresponding probability value in the user model component 502. The user agent component 204 includes the appropriate attribute value and newProb as arguments in each API call. Adjusting the probability values included in a point distribution involves simply replacing the current probability value in the distribution with the newly adjusted probability value. The following technique can be used to adjust the probability for an attribute value in an n-gram distribution given a new probability value, newProb:

Determine a differential probability for a particular index value of the distribution as:
    (newProb—the probability at the index value);
  Modify the probability for each index value covered by the n-gram as follows:
    i. Determine a weight ratio as the n-gram weight divided by nGramSum,
    ii. Determine a variable, DIFF, as the product of the differential probability and the weight ratio; and
    iii. Add the variable DIFF to the distribution for the given index.

The above examples consider only two possible subscriber feedback responses, namely the positive and negative feedback responses of yes and no. In general, additional responses may be identified by some services. Persons skilled in the art will understand that the techniques described here to learn from event responses can be extended to support these services allowing for additional subscriber feedback.

In addition, importance levels or weighting can be assigned to the different attributes used in determining a subscriber's availability to perhaps better predict the subscriber's needs. For example, perhaps a social relationship with a caller is more important than the day of the week for a subscriber. Such weighting can be incorporated into the techniques described above by giving greater importance to the distributions used in calculating the subscriber's availability that related to the more important situation and event attributes.

In the event that the user model component 502 is adjusted such that certain service events should not be presented to the subscriber in certain circumstances the user agent component 204 can be configured to return or reset any probability values updated in the user model component 502 to corresponding default values after a pre-determined amount of time elapses and/or an occurrence of a pre-determined number of events.

The executable instructions of a computer program for carrying out the methods illustrated in FIGS. 1, 4, and 7 can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any medium that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, device, or propagation medium. More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

The methods, systems, and computer program products described here allow service developers to create smart services that utilize the personal information and context of a service subscriber without requiring actual knowledge of the subscriber's personal information. Moreover, the service and user models and agents of the platform 200 provide a common interface that can be used to deliver smart services to subscribers in a consistent manner.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for delivering smart services, comprising:
    defining a service based on a situation of a service subscriber and an event for interacting with the service subscriber on behalf of a service developer;
    defining the situation in terms of abstracted subscriber context information based on private information of a service subscriber that is abstracted to restrict access by the service developer to the private information of the service subscriber in its original, unaltered form;
    defining the event in terms of at least one of an event type and an event attribute;
    identifying an action associated with the defined service;
    determining that the service subscriber is in the defined situation upon an occurrence of the event based on comparing current subscriber context information with the abstracted subscriber context information based on private information of the service subscriber; and
    performing, in response to determining that the service subscriber is in the defined situation upon occurrence of the event, the action for the service subscriber, wherein performing the identified action for the service subscriber includes accessing service-specific resources that are made only indirectly available to the service subscriber through performing the action;
    wherein at least one of the preceding actions is performed on at least one electronic hardware component including a computer-based instruction-executing-processor.

2. The method of claim 1 comprising:
    receiving a request to determine an availability of the service subscriber; and
    identifying a service associated with the event identified.

3. The method of claim 2, comprising:
    filtering the current subscriber context information;
    wherein performing the identified action comprises providing the filtered current subscriber context information to the service, allowing the service to generate a response on behalf of the subscriber using the filtered current subscriber context information.

4. The method of claim 2, wherein performing the identified action comprises generating a response based on the at least one of the comparing current subscriber context information with the abstracted subscriber context information and a probability related to an availability of the service subscriber, including at least one of:
    generating the response including information related to the event for presentation to the service subscriber; and
    responding to the event on behalf of the service subscriber without forwarding information related to the event to the service subscriber.

5. The method of claim 4, comprising receiving feedback from the service subscriber in response to a presentation of the response to the service subscriber.

6. The method of claim 5, comprising updating the probability related to the availability of the service subscriber for responding based on the feedback received from the service subscriber.

7. The method of claim 4, comprising exchanging information related to the service with an agent of another service.

8. The method of claim 2, comprising verifying the service subscriber is subscribed to the service by accessing a user directory component for storing subscriber information including service subscription information identifying a subscription to the service for the service subscriber.

9. A system for delivering smart services, comprising:
    a processor;
    memory;
    a service model component configured to define a service based on a situation of a service subscriber and an event for interacting with the service subscriber on behalf of a service developer;
    a situation model component configured to define the situation in terms of abstracted subscriber context information based on private information of a service subscriber that is abstracted to restrict access by the service developer to the private information of the service subscriber in its original, unaltered form;

an event model component configured to define the event in terms of at least one of an event type and an event attribute;

a user agent component configured to receive a request to determine that the service subscriber is in the defined situation upon occurrence of the event based on comparing current subscriber context information with the abstracted subscriber context information based on private information of the service subscriber; and;

wherein at least one of the system components includes program instructions stored in the memory and executable by the processor.

10. The system of claim 9 comprising an agent manager component configured to identify a service associated with the event.

11. The system of claim 9, wherein the user agent component is further configured to filter the current subscriber context information using filtering information included in a user model component before providing the filtered current subscriber context information to the service, allowing the service to generate the response on behalf of the service subscriber using the filtered current subscriber context information.

12. The system of claim 9, wherein the service agent component, operatively coupled to the user agent component, is further configured to generate a response to the event based on the at least one of the comparing current subscriber context information with the abstracted subscriber context information by the user agent and a probability related to an availability of the subscriber for responding to the event.

13. The system of claim 9, wherein in performing the action, the service agent component is further configured to at least one of:
generate the response including information related to the event for presentation to the service subscriber; and
respond to the event on behalf of the subscriber without forwarding information related to the event to the service subscriber.

14. The system of claim 13, wherein the user agent component is further configured to receive feedback from the service subscriber via the service agent component in response to a presentation of the response to the service subscriber.

15. The system of claim 14, wherein the user agent component is configured to update a user model component, including the probability related to the availability of the service subscriber, based on the feedback received from the service subscriber.

16. The system of claim 9, comprising:
a second service agent component associated with another service; and
a message-oriented middleware component configured to exchange information related to at least one of the event and the service associated with the second service agent component.

17. The system of claim 9, comprising a service manager component, coupled to a user directory component for storing service subscriber information including service subscription information identifying a subscription to the service for the service subscriber, the service manager component configured to verify the service subscriber is subscribed to the service.

18. A non-transitory computer readable medium containing a computer program, executable by a machine, for delivering smart services, the computer program comprising executable instructions for:
defining a service based on a situation of a service subscriber and an event for interacting with the service subscriber on behalf of a service developer;
defining the situation in terms of abstracted subscriber context information based on private information of a service subscriber that is abstracted to restrict access by the service developer to the private information of the service subscriber in its original, unaltered form;
defining the event in terms of at least one of an event type and an event attribute;
identifying an action associated with the service;
determining that the service subscriber is in the defined situation upon an occurrence of the event based on comparing current subscriber context information with the abstracted subscriber context information based on private information of the service subscriber; and
performing, in response to determining that the service subscriber is in the defined situation upon occurrence of the event, the action for the service subscriber, wherein performing the identified action includes accessing service-specific resources that are made only indirectly available to the service subscriber through performing the action.

* * * * *